(12) United States Patent
Ishikawa et al.

(10) Patent No.: US 9,333,378 B2
(45) Date of Patent: May 10, 2016

(54) AIR CLEANING APPARATUS AND METHOD FOR PREDICTING BREAKTHROUGH TIME FOR THE SAME

(75) Inventors: Shingo Ishikawa, Tokyo (JP); Gaku Sasaki, Tokyo (JP); Hironobu Takeuchi, Tokyo (JP); Takeshi Honda, Tokyo (JP)

(73) Assignee: KOKEN LTD., Tokyo (JP)

( * ) Notice: Subject to any disclaimer, the term of this patent is extended or adjusted under 35 U.S.C. 154(b) by 321 days.

(21) Appl. No.: 14/001,257

(22) PCT Filed: Feb. 27, 2012

(86) PCT No.: PCT/JP2012/054842
§ 371 (c)(1),
(2), (4) Date: Aug. 23, 2013

(87) PCT Pub. No.: WO2012/118043
PCT Pub. Date: Sep. 7, 2012

(65) Prior Publication Data
US 2013/0327335 A1    Dec. 12, 2013

(30) Foreign Application Priority Data
Feb. 28, 2011 (JP) ................................. 2011-042385

(51) Int. Cl.
| | | |
|---|---|---|
| *B01D 46/46* | (2006.01) | |
| *A62B 23/02* | (2006.01) | |
| *B01D 46/00* | (2006.01) | |
| *B01D 46/44* | (2006.01) | |
| *A62B 7/10* | (2006.01) | |
| *B01D 53/30* | (2006.01) | |
| *A62B 18/02* | (2006.01) | |

(Continued)

(52) U.S. Cl.
CPC ................. *A62B 23/025* (2013.01); *A62B 7/10* (2013.01); *A62B 18/02* (2013.01); *A62B 18/088* (2013.01); *B01D 46/0086* (2013.01); *B01D 46/442* (2013.01); *B01D 46/444* (2013.01); *B01D 46/448* (2013.01); *B01D 46/46* (2013.01); *B01D 53/30* (2013.01); *A62B 27/00* (2013.01);

(Continued)

(58) Field of Classification Search
CPC .... A62B 18/088; A62B 23/025; B01D 46/44; B01D 46/442; B01D 46/448; B01D 46/46; B01D 46/444; B01D 46/0086
USPC ...................... 95/8, 10, 11; 96/417, 420, 421; 55/DIG. 33, DIG. 35
See application file for complete search history.

(56) References Cited

U.S. PATENT DOCUMENTS 8,328,903 B2 * 12/2012 Parham ................ A62B 18/088
                                                         95/8

FOREIGN PATENT DOCUMENTS

| JP | 3-207425 | 9/1991 |
|---|---|---|
| JP | 2006-263238 | 10/2006 |

(Continued)

*Primary Examiner* — Robert A Hopkins
(74) *Attorney, Agent, or Firm* — Clark & Brody

(57) ABSTRACT

An air cleaning apparatus capable of predicting a breakthrough time of a filtering portion is provided. Regarding a mask 1 as one example of the air cleaning apparatus, data on concentration of the poisonous gas element with which in ambient air (40) is contaminated on the upstream side of a filtering portion (3), a flow rate of the air (40) passing through the filtering portion (3), a temperature of the air (40), and relative humidity of the air (40) are input to an arithmetic processing unit (25). A breakthrough-time prediction formula in which the concentration, the flow rate, the temperature, and the relative humidity are provided as variables is programmed in the arithmetic processing unit (25), and the breakthrough time of the filtering portion (3) is calculated through the prediction formula, based on the data on the concentration and the like.

22 Claims, 13 Drawing Sheets

(51) Int. Cl.
*A62B 18/08* (2006.01)
*A62B 27/00* (2006.01)

(52) U.S. Cl.
CPC ... *B01D2257/304* (2013.01); *B01D 2257/7022* (2013.01); *B01D 2257/7027* (2013.01); *B01D 2259/4508* (2013.01); *B01D 2259/4541* (2013.01)

(56) References Cited

FOREIGN PATENT DOCUMENTS

| JP | 2007-117859 | 5/2007 |
|----|-------------|--------|
| JP | 2009-207757 | 9/2009 |

\* cited by examiner

AIR CLEANING APPARATUS AND METHOD FOR PREDICTING BREAKTHROUGH TIME FOR THE SAME

TECHNICAL FIELD

The present invention relates to an air cleaning apparatus including a filtering portion to remove a poisonous gas in atmospheres and a method of predicting a breakthrough time for the same.

BACKGROUND

There has been known an air cleaning apparatus such as a mask including a filtering portion, as a constitutional element, that filters air contaminated or polluted with a poisonous gas, wherein the filtering portion removes the poisonous gas to clean the air. Also, there has been known a gas mask, which is one of air cleaning apparatuses that detects the concentration of a poisonous gas included in the air after passing through the filtering portion by a sensor provided on a downstream side of the filtering portion in the gas mask. There has been known an air cleaning apparatus that can estimate a residual breakthrough time of the filtering portion by estimating a degree of breakthrough progress of a filtering member of the filtering portion. Further, there has been known an air cleaning apparatus that is capable of predicting a life span of the filtering portion in accordance with variation in a flow rate of air contaminated with a poisonous gas passing through the filtering portion or variation in humidity of the air.

For example, a protective mask described in JP 2006-263238A (PTL 1) includes a semiconductor odor sensor that can estimate a time of replacement for a canister, disposed on the downstream side of the canister.

In a filtering replacement time discriminating apparatus described in JP 1991-207425A (PTL 2), a first gas sensor is provided on the upstream side of a filter so as to measure a concentration of molecule of unnecessary gases such as a gas having an offensive odor in the outside air. A second gas sensor and an anemometer are provided on the downstream side of the filter. A difference between the molecular concentration of the unnecessary gas C1 detected by the first gas sensor and the molecular concentration of the unnecessary gas C2 detected by the second gas sensor is calculated, and an amount of airflow Q per unit time to be processed through the filter is calculated using the anemometer as well. An amount of removal of the unnecessary gas through the filter is calculated based on C1, C2, and Q, and a judgment is made by comparing the amount of removal with a limit removal offensive gas amount at which the filter deteriorates, so that it can be determined whether the breakthrough time is left.

Also, an air cleaning apparatus described in JP 2007-117859A (PTL 3) includes a flow rate detector to detect a flow rate of air passing through a gas filter and a humidity detector to detect the humidity of the air passing through the gas filter, calculates an amount of exhaustion of the gas filter based on the detected data from each detector, and predicts a residual amount of the gas filter based on the amount of exhaustion. The residual amount of the gas filter indicates the residual amount of the breakthrough time of the filtering member.

CITATION LIST

Patent Literature

{PTL 1} JP 2006-263238A
{PTL 2} JP 1991-207425A
{PTL 3} JP 2007-117859A

SUMMARY

Technical Problem

The apparatus described in PTL 1 is configured to detect the concentration of a hydrogen sulfide gas on the downstream side of the canister by a semiconductor odor sensor element and issue an alarm when the concentration is high, so that the apparatus cannot detect the life span of the canister that is varied according to the work environment.

In the apparatus described in PTL 2, the first gas sensor cannot predict the reduction of the breakthrough time of the filter when the molecular concentration of the unnecessary gas in the outside air is high. Also, the second gas sensor provided on the downstream side of the filter, for example, on the inner side of the gas mask, tends to become larger in size when its precision is high, and there has been a problem in that the gas mask wearer's field of vision is obstructed, and work is hampered. Also, in the apparatus, the judgment on a magnitude is made by comparing the amount of removal with the limit removal offensive gas amount at which the filter deteriorates, so that it is difficult to judge in stages the state of deterioration of the filter.

The apparatus described in PTL 3 is useful when the concentration of poisonous gas element in the outside air is constant. However, when the concentration of the poisonous gas is varied along with a lapse of time, this apparatus cannot be used. Also, regarding humidity that affects the exhaustion of the gas filter, a breakthrough characteristic curve of the gas filter with regard to the humidity on three levels is exemplified. However, when the breakthrough characteristic of the gas filter is substantially varied due to the humidity, there is a case where a dependence on only breakthrough characteristic curves to be exemplified lacks an accuracy of a judgment on the filtering replacement time. Accordingly, in order to deal with this case, it is necessary to acquire a magnitude of breakthrough characteristic curves that clarifies the influence of the humidity, that is, to produce a data map having a large capacity.

Further, when the temperature of the air contaminated with the poisonous gas is varied, these conventional technologies do not provide a means to be dealt with. Accordingly, when the breakthrough characteristic of the filtering member is varied due to the temperature, information obtained through these conventional technologies might lack an accuracy.

The present invention has been achieved in view of the above circumstances to solve the problems, and it is an object of the present invention to provide an air cleaning apparatus that is capable of predicting a breakthrough time of a filtering portion and a method of predicting a breakthrough time for the apparatus even if the concentration of a poisonous gas included in air on the upstream side of the filtering portion, the flow rate of the air passing through the filtering portion, the temperature of the air, and the humidity of the air are changed.

Solution to Problem

In order to solve this problem, the present invention includes the invention according to an air cleaning apparatus and the invention according to a method of predicting a breakthrough time for the air cleaning apparatus.

The present invention including an air cleaning apparatus may provide an air cleaning apparatus that includes a filtering portion to allow air contaminated with a poisonous gas to pass through from an upstream side to a downstream side so as to remove the poisonous gas, and configured to be capable of predicting a breakthrough time during which concentration of the poisonous gas on the downstream side of the filtering portion reaches breakthrough concentration, which is arbitrarily set with respect to the concentration of the poisonous gas.

The present invention including the air cleaning apparatus further includes the following features:

the air cleaning apparatus may further include an arithmetic processing unit configured to input data on the concentration of the poisonous gas in the air on the upstream side of the filtering portion, a flow rate of the air passing through the filtering portion, a temperature of the air on the upstream side, and relative humidity of the air on the upstream side; and it may be configured such that a breakthrough-time prediction formula in which the concentration of the poisonous gas included in the air on the upstream side of the filtering portion used in the air cleaning apparatus, the flow rate, the temperature, and the relative humidity are provided as variables is programmed in the arithmetic processing unit, and the breakthrough time is predictable by the prediction formula based on the data.

According to an embodiment of the present invention including the air cleaning apparatus, in the arithmetic processing unit, the prediction formula may be formulated prior to use of the air cleaning apparatus, based on a reference condition that is constituted by the concentration of the poisonous gas included in the air on the upstream side, the flow rate, the temperature, the relative humidity, and the breakthrough concentration, and on the breakthrough time measured under the reference condition.

According to another embodiment of the present invention including the air cleaning apparatus, the arithmetic processing unit may correct the breakthrough time of the reference condition for the filtering portion, based on the temperature and the relative humidity.

According to another embodiment of the present invention including the air cleaning apparatus, the air cleaning apparatus may include at least one of a detector of the concentration of the poisonous gas, a detector of the flow rate, a detector of the temperature, and a detector of the relative humidity.

According to another embodiment of the present invention including the air cleaning apparatus, the detector for any item of the data, out of the data on the concentration of the poisonous gas in the air on the upstream side of the filtering portion, the blow rate, the temperature, and relative humidity, is not used when the item has a constant value during use of the air cleaning apparatus.

According to another embodiment of the present invention including the air cleaning apparatus, the arithmetic processing unit may be used in a cordless state.

According to another embodiment of the present invention including the air cleaning apparatus, at least one item of the data, out of the data on the concentration of the poisonous gas included in the air on the upstream side of the filtering portion, the flow rate, the temperature, and the relative humidity, may be input to the arithmetic processing unit by radio.

According to another embodiment of the present invention including the air cleaning apparatus, the poisonous gas is a reference gas provided as a toxic gas to be arbitrarily selected, and concentration of the reference gas on the upstream side is represented as Co (ppm), and the flow rate is represented as Q (L/min), and the breakthrough concentration is represented as S (ppm), and a time during which concentration of the reference gas on the downstream side reaches S (ppm) is the breakthrough time, and wherein the prediction formula is represented by a formula below, breakthrough time=reference breakthrough time×concentration variation ratio×flow rate variation ratio×temperature variation ratio×humidity variation ratio×breakthrough concentration variation ratio;

reference breakthrough time: a duration time during which the concentration on the downstream side of the filtering portion reaches A %, which is a value that is less than 100% and arbitrarily set as the breakthrough concentration with respect to the concentration Co, in a case where the concentration Co, the flow rate Q, the temperature T, and the relative humidity RH are kept constant;

concentration variation ratio: a correction coefficient with respect to concentration variation calculated by obtaining the reference breakthrough times for the concentration Co at least on two levels while the flow rate, the temperature, and the humidity are kept constant;

flow rate variation ratio: a correction coefficient with respect to flow rate variation calculated by obtaining the reference breakthrough times for the flow rate Q at least on two levels while the concentration, the temperature, and the humidity are kept constant;

temperature variation ratio: a correction coefficient with respect to temperature variation calculated by obtaining the reference breakthrough times for the temperature T at least on two levels while the concentration, the flow rate, and the relative humidity are kept constant;

humidity variation ratio: a correction coefficient with respect to humidity variation calculated by obtaining the reference breakthrough times for at least two levels including one level at which a level of the relative humidity RH is equal to or higher than 50% while the concentration, the flow rate, and the temperature are kept constant;

breakthrough concentration variation ratio: a correction coefficient with respect to breakthrough concentration variation calculated by obtaining an A % breakthrough time corresponding to the breakthrough concentration A % obtained with respect to the flow rates Q at least on three levels, and a B % breakthrough time corresponding to breakthrough concentration B % that is different from the breakthrough concentration A % on one level of flow rate Q while the concentration, the temperature, and the humidity are kept constant.

According to another embodiment of the present invention including the air cleaning apparatus, the formula according to the embodiment of the present invention is represented by formulas (1) and (2) described below, (1) in a case of the relative humidity RH≥50%, breakthrough time=1/reference breakthrough time× $(C_o^a \times 10^b) \times (c \times 1/Q+d) \times (i \times EXP^{j \times Q} \times Ln(S/C_o \times 100)+1) \times (e \times RH+f) \times (g \times T+h);$ (2) in a case of the relative humidity RH<50%, breakthrough time=1/reference breakthrough time× $(Co^a \times 10^b) \times (c \times 1/Q+d) \times (i \times EXP^{j \times Q} \times Ln(S/C_o \times 100)+1) \times (g \times T+h);$ and in the formulas (1) and (2) above, reference breakthrough time: a duration time during which the concentration on the downstream side reaches A %, which is a value that is less than 100% and arbitrarily set with respect to the concentration $C_o$, in a case where the concentration $C_o$, the flow rate Q, the temperature T, and the relative humidity RH are kept constant;

T: temperature (° C.);

RH: relative humidity (%);

a, b: constants obtained based on the concentration $C_o$ at least on two levels and a breakthrough time during which the concentration of the poisonous gas on the downstream side of the filtering portion reaches A % of the concentration $C_o$ with regard to each concentration $C_o$ while the flow rate Q, the temperature T, and the relative humidity RH are kept constant;

c, d: constants obtained based on the flow rates Q at least on two levels and a breakthrough time during which the concentration of the poisonous gas on the downstream side of the filtering portion reaches A % of the concentration $C_o$ with regard to each flow rate Q while the concentration $C_o$, the temperature T, and the relative humidity RH are kept constant;

e, f: constants obtained based on at least two levels including one level at which a level of the relative humidity RH is equal to or higher than 50%, and a breakthrough time during which the concentration of the poisonous gas on the downstream side of the filtering portion reaches A % of the concentration $C_o$ with regard to each relative humidity RH while the concentration $C_o$, the flow rate Q, and the temperature T are kept constant;

g, h: constants obtained based on temperatures at least on two levels, and a breakthrough time during which the concentration of the poisonous gas on the downstream side of the filtering portion reaches A % of the concentration $C_o$ with regard to each temperature T while the concentration $C_o$, the flow rate Q, and the relative humidity RH are kept constant;

j: constants obtained based on the A % breakthrough times and the flow rates Q in a case where the flow rate Q is changed at least on three levels, and the B % breakthrough time using one level out of the three levels of flow rate Q at which the A % breakthrough time is obtained, while the concentration Co, the temperature T, and the relative humidity RH are kept constant.

According to another embodiment of the present invention including the air cleaning apparatus, the arithmetic processing unit may be programmed in such a manner that the breakthrough time is calculated by using a relative breakthrough ratio with respect to the reference gas of the poisonous gas.

According to another embodiment of the present invention including the air cleaning apparatus, correction based on a dissolution rate in water in a case where the poisonous gas is in a liquid state is made for prediction of the breakthrough time for which the relative breakthrough ratio is used.

According to another embodiment of the present invention including the air cleaning apparatus, in the arithmetic processing unit, a degree of breakthrough progress per unit time with respect to the filtering portion can be obtained, and the breakthrough time of the filtering portion is calculated by multiplying the degree of breakthrough progress.

According to another embodiment of the present invention including the air cleaning apparatus, a time ranging from 1/6000 to 5/600 min may be used for the unit time.

According to another embodiment of the present invention including the air cleaning apparatus, the arithmetic processing unit can calculate at least one of a residual breakthrough time and a residual use ratio with respect to the filtering portion.

According to another embodiment of the present invention including the air cleaning apparatus, the air cleaning apparatus may be made up of any of a gas mask and a local exhaust device.

According to another embodiment of the present invention including the air cleaning apparatus, the detector of the flow rate may be arranged in any of the upstream side and the downstream side of the filtering portion in the gas mask.

According to another embodiment of the present invention including the air cleaning apparatus, the detector of the flow rate may be arranged in any of the upstream side and the downstream side of the filtering portion in the local exhaust device.

The present invention including a method for predicting a breakthrough time for the air cleaning apparatus may provide a method, in a case where air contaminated with a poisonous gas passes through a filtering portion of an air cleaning apparatus from an upstream side to a downstream side, for predicting a breakthrough time until concentration of the poisonous gas on the downstream side of the filtering portion reaches breakthrough concentration, which is arbitrarily set with respect to the concentration of the poisonous gas.

Also, the present invention including the method for predicting the breakthrough time is characterized as follows. That is, in the air cleaning apparatus, data on the concentration of the poisonous gas included in the air on the upstream side of the filtering portion, a flow rate of the air passing through the filtering portion, a temperature of the air on the upstream side, and relative humidity of the air on the upstream side, may be input to an arithmetic processing unit, and in the arithmetic processing unit, the breakthrough time is calculated based on the data and a breakthrough-time prediction formula programmed in the arithmetic processing unit, where the concentration of the poisonous gas included in the air on the upstream side, the flow rate, the temperature, and the relative humidity are provided as variables.

According to one embodiment of the present invention including the method for predicting the breakthrough time, the breakthrough-time prediction formula may be formulated in the arithmetic processing unit prior to use of the air cleaning apparatus, based on a reference condition that is constituted by the concentration of the poisonous gas included in the air on the upstream side, the flow rate, the temperature, the relative humidity, and the breakthrough concentration, and on the breakthrough time measured under the reference condition.

According to another embodiment of the present invention including the method for predicting the breakthrough time, the arithmetic processing unit may correct the breakthrough time of the reference condition for the filtering portion, based on the temperature and the relative humidity.

According to another embodiment of the present invention including the method for predicting the breakthrough time, the poisonous gas is a reference gas provided as a toxic gas to be arbitrarily selected, and concentration of the reference gas on the upstream side is represented as $C_o$ (ppm), and the flow rate is represented as Q (L/min), and the breakthrough concentration is represented as S (ppm), and a time during which concentration of the reference gas on the downstream side reaches S (ppm) is the breakthrough time, and wherein the prediction formula is represented by a formula below, breakthrough time=reference breakthrough time×concentration variation ratio×flow rate variation ratio×temperature variation ratio×humidity variation ratio×breakthrough concentration variation ratio;

reference breakthrough time: a duration time during which the concentration on the downstream side of the filtering portion reaches A %, which is a value that is less than 100% and arbitrarily set as the breakthrough concentration with respect to the concentration $C_o$, in a case where the concentration $C_o$, the flow rate Q, the temperature T, and the relative humidity RH are kept constant;

concentration variation ratio: a correction coefficient with respect to concentration variation calculated by obtaining the reference breakthrough times for the concentrations $C_o$ at least on two levels while the flow rate, the temperature, and the humidity are kept constant;

flow rate variation ratio: a correction coefficient with respect to flow rate variation calculated by obtaining the reference breakthrough times for the flow rates Q at least on two levels while the concentration, the temperature, and the humidity are kept constant;

temperature variation ratio: a correction coefficient with respect to temperature variation calculated by obtaining the reference breakthrough times for the temperatures T at least on two levels while the concentration, the flow rate, and the relative humidity are kept constant;

humidity variation ratio: a correction coefficient with respect to humidity variation calculated by obtaining the reference breakthrough time for at least two levels including one level at which a level of the relative humidity RH is equal to or higher than 50% while the concentration, the flow rate, and the temperature are kept constant;

breakthrough concentration variation ratio: a correction coefficient with respect to breakthrough concentration variation calculated by obtaining an A % breakthrough time corresponding to the breakthrough concentration A % obtained with respect to the flow rates Q at least on three levels, and a B % breakthrough time corresponding to breakthrough concentration B % that is different from the breakthrough concentration A % on one level of flow rate Q while the concentration, the temperature, and the humidity are kept constant.

According to another embodiment of the present invention including the method for predicting the breakthrough time, the formula according to the one of the embodiments is represented by formulas (1) and (2) described below, (1) in a case of the relative humidity RH≥50%, breakthrough time=1/reference breakthrough time×$(C_o{}^a \times 10^b) \times (c \times 1/Q+d) \times (i \times \text{EXP}^{j \times Q} \times \text{Ln}(S/C_o \times 100)+1) \times (e \times \text{RH}+f) \times (g \times T+h)$;

(2) in a case of the relative humidity RH<50%, breakthrough time=1/reference breakthrough time×$(C_o{}^a \times 10^b) \times (c \times 1/Q+d) \times (i \times \text{EXP}^{j \times Q} \times \text{Ln}(S/C_o \times 100)+1) \times (g \times T+h)$; and in the formulas (1) and (2) above, reference breakthrough time: a duration time during which the concentration on the downstream side reaches A %, which is a value that is less than 100% and arbitrarily set with respect to the concentration Co, in a case where the concentration Co, the flow rate Q, the temperature T, and the relative humidity RH are kept constant;

T: temperature (° C.);

RH: relative humidity (%);

a, b: constants obtained based on the concentrations Co at least on two levels and a breakthrough time during which the concentration of the poisonous gas on the downstream side of the filtering portion reaches A % of the concentration Co with regard to each concentration Co while the flow rate Q, the temperature T, and the relative humidity RH are kept constant;

c, d: constants obtained based on the flow rates Q at least on two levels and a breakthrough time during which the concentration of the poisonous gas on the downstream side of the filtering portion reaches A % of the concentration Co with regard to each flow rate Q while the concentration Co, the temperature T, and the relative humidity RH are kept constant;

e, f: constants obtained based on at least two levels including one level at which a level of the relative humidity RH is equal to or higher than 50%, and a breakthrough time during which the concentration of the poisonous gas on the downstream side of the filtering portion reaches A % of the concentration Co with regard to each relative humidity RH while the concentration Co, the flow rate Q, and the temperature T are kept constant;

g, h: constants obtained based on temperatures at least on two levels, and a breakthrough time during which the concentration of the poisonous gas on the downstream side of the filtering portion reaches A % of the concentration Co with regard to each temperature T while the concentration Co, the flow rate Q, and the relative humidity RH are kept constant;

i, j: constants obtained based on an A % breakthrough time and the flow rate Q in a case where the flow rate Q is changed at least on three levels, and a B % breakthrough time on one level out of the three levels of the flow rate Q at which the A % breakthrough time is obtained, while the concentration Co, the temperature T, and the relative humidity RH are kept constant.

According to another embodiment of the present invention including the method for predicting the breakthrough time, the arithmetic processing unit may be programmed in such a manner that the breakthrough time can also be calculated by using a relative breakthrough ratio of the poisonous gas with respect to the reference gas.

According to another embodiment of the present invention including the method for predicting the breakthrough time, correction based on a dissolution rate in water in a case where the poisonous gas is in a liquid state may be made for the calculation of the breakthrough time for which the relative breakthrough ratio is used.

In the present invention, by "breakthrough" of "breakthrough time" is meant that when the air contaminated with the poisonous gas passes through the filtering portion, the concentration of the poisonous gas in the air after passing through the filtering portion reaches concentration equal to or higher than concentration that is set to an arbitrary value. The concentration set to the arbitrary value is referred to as "breakthrough concentration". Also, by "breakthrough time" is meant a service life after which the filtering portion reaches "breakthrough".

In the present invention, by "threshold value" is meant a gas concentration to the extent that causes health impairment when a human continues to inhale a poisonous gas having a certain degree of gas concentration for a uniform period of time.

Solution to Problem

According to the embodiment of the present invention, the air cleaning apparatus measures the concentration of the poisonous gas on the upstream side of the filtering portion, even if the space on the downstream side of the filtering portion is limited, a large-size sensor with high precision to measure the concentration can be used.

The air cleaning apparatus calculates and predicts the breakthrough time based on a breakthrough-time calculation formula in which the concentration of the poisonous gas in the air on the upstream side of the filtering portion, the temperature of the air, the humidity of the air, and the flow rate of the air passing through the filtering portion are correlated, so that the breakthrough time can exactly be calculated even if the any one of the concentration of the poisonous gas on the upstream side of the filtering portion, the temperature and humidity of the air, and the flow rate of the air passing through the filtering portion is changed during the use of the air cleaning apparatus. It is meant that, when the filtering portion is a canister, the life span of the canister can exactly be calculated.

Also, for example, in the case where the air cleaning apparatus is a gas mask, the threshold value is applied for breakthrough concentration, and the measurement intervals of each measuring portion are shortened, so that, even when the concentration of the poisonous gas in the air on the upstream side of the filtering portion, the temperature of the air, and the humidity of the air are changed in a short interval of time, or the flow rate of the air passing through the filtering portion is changed from one minute to the next along with the breathing of the wearer, not only can the breakthrough time be calculated with high precision, but also can the breakthrough time be calculated by calculating the degree of breakthrough progress that corresponds to relentless changes in the flow rate, which is attributed to the breathing which the gas mask wearer takes. Also, according to such features, the filtering capacity of the filtering element may be utilized effectively.

DESCRIPTION OF EMBODIMENTS

Hereinafter, an air cleaning apparatus according to the present invention will be described in detail by referring to the attached drawings.

Figure 1:
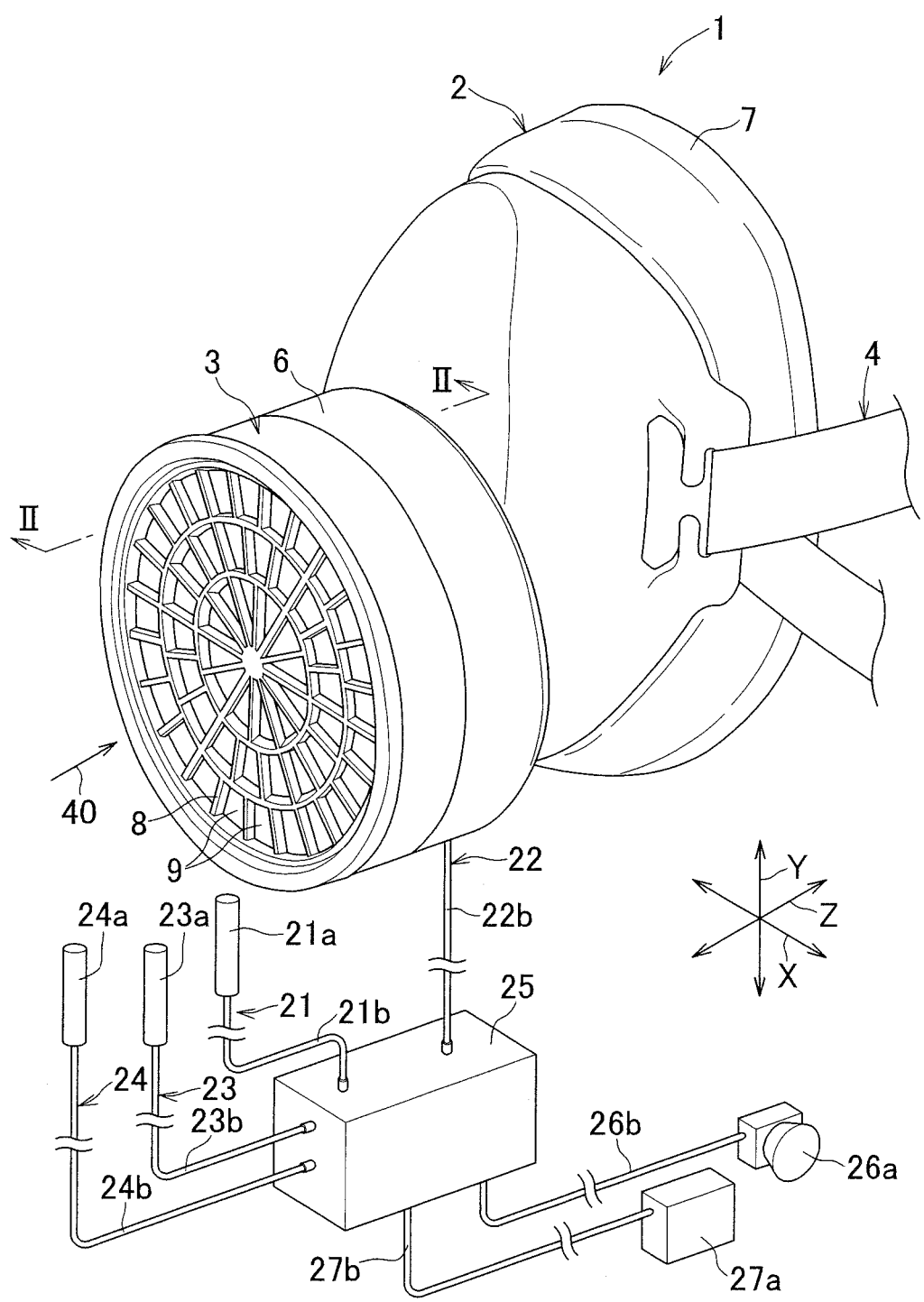
FIG. 1 is a perspective view of an air cleaning apparatus.

FIG. 1 is a perspective view of a gas mask 1 of the air cleaning apparatus according to an embodiment of the present invention. The gas mask 1 includes a facepiece 2 that covers nostrils and the mouth, of a mask wearer (not shown), a filtering portion 3 that is replaceably attached and disposed forward of the facepiece 2, and a strap 4 that extends backward from the facepiece 2 and worn around the head of the wearer. The facepiece 2 includes a cylindrical portion 6 that extends forward of the mask 1 in the left direction of a double-headed arrow Z. The filtering portion 3 is arranged on a front end portion of the cylindrical portion 6. A peripheral edge portion 7 of the facepiece 2 tightly contacts to the wearer's face when the mask 1 is worn. The filtering portion 3 includes a grid portion 8 for breathability at the front surface part thereof, and a multiplicity of air passages 9 are formed in the grid portion 8. One example of the filtering portion 3 to be used includes a canister that is demountably formed on the cylindrical portion 6. It should be noted that the cylindrical portion 6 is expediently formed to connect the filtering portion 3 to the facepiece 2 but not indispensable in the mask 1.

The mask 1 also includes a concentration measuring unit 21 arranged on the outer side of the mask 1 and in the vicinity of the filtering portion 3 in order to measure the concentration of the poisonous gases such as cyclohexane and toluene present in the ambient air 40, a flow rate measuring unit 22 that penetrates from the outer side of the mask 1 into the inside of the cylindrical portion 6, a temperature measuring unit 23 to measure a temperature of the air 40, and a humidity measuring unit 24 to measure humidity of the air 40. As for the measuring units 21, 22, 23, and 24, sensors 21a, 22a (see FIG. 2), 23a, and 24a are electrically connected to an arithmetic processing unit 25 via respectively communication wires 21b, 22b, 23b, and 24b. The arithmetic processing unit 25 is electrically connected to an alarm 26a via a wire 26b and electrically connected to a display 27a via a wire 27b. Also, it is possible to transmit measurement results by radio from the measuring units 21, 22, 23 and 24 to the arithmetic processing unit 25 or transmit arithmetic results and the like by radio from the arithmetic processing unit 25 to the alarm 26a and/or the display 27a.

In FIG. 1, a lateral direction, an up-and-down direction, and a forward-and-backward direction of the mask 1 are shown by double-headed arrows X, Y, and Z.

Figure 2:
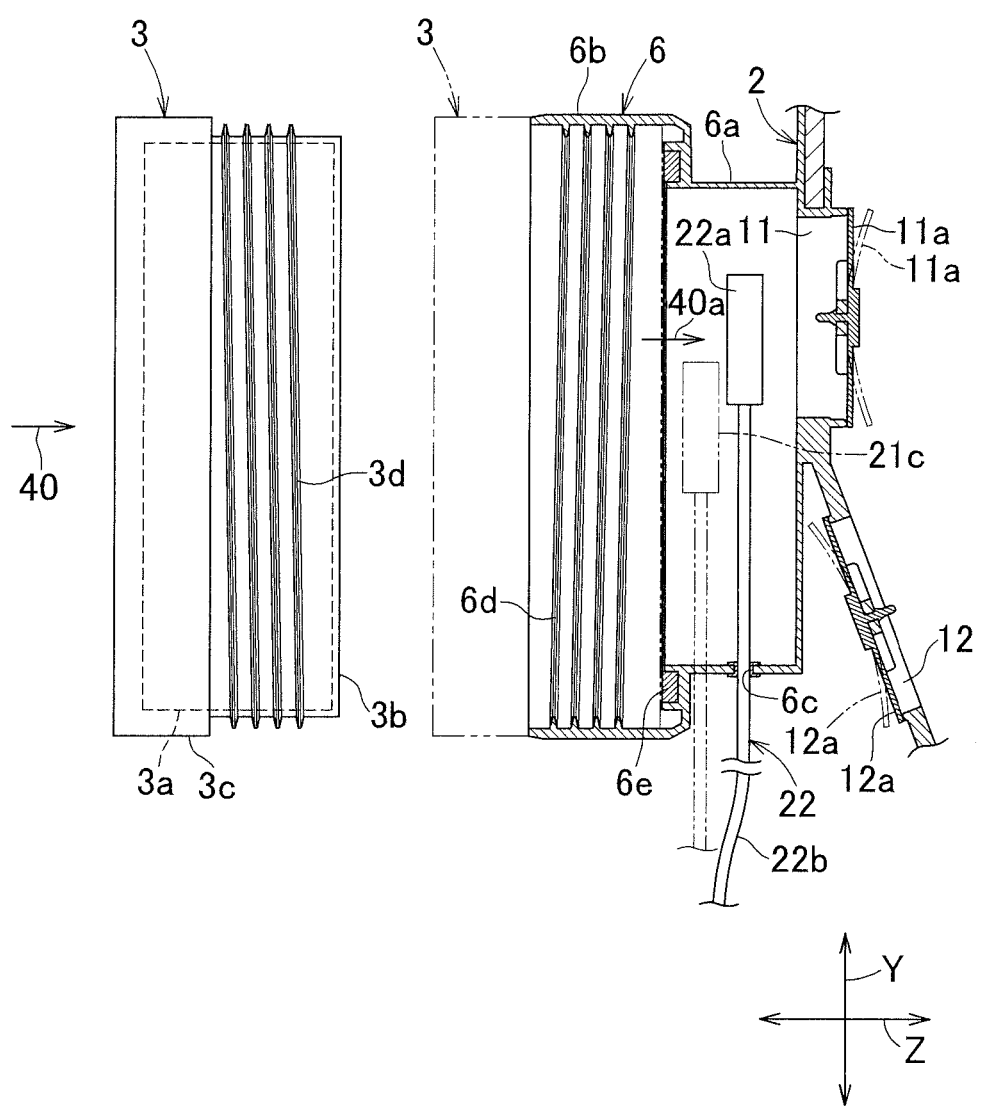
FIG. 2 is a partial cross-sectional enlarged view taken along line II-II in FIG. 1.

FIG. 2 is a partial cross-sectional enlarged view taken along line II-II of FIG. 1, wherein the filtering portion 3 is illustrated in an imaginary line. Also, the filtering portion 3 which is detached from the cylindrical portion 6 is illustrated in a side view as a reference. The facepiece 2 includes an inhalation opening 11 and an exhalation opening 12. A check valve 11a is provided to the inhalation opening 11, and a check valve 12a is provided to the exhalation opening 12. The check valve 11a is moved to a position, where the check valve 11a is shown as an imaginary line, by inhalation of the wearer so as to release the inhalation opening 11. The check valve 12a is moved to a position, where the check valve 12a is shown as an imaginary line, by exhalation of the wearer so as to release the exhalation opening 12.

The cylindrical portion 6 is arranged in front of the inhalation opening 11, and includes a small diameter portion 6a connecting with the facepiece 2 and a large diameter portion 6b that is threadedly engaged with the filtering portion 3. The flow rate measuring unit 22 penetrates into the small diameter portion 6a via a mounting hole 6c, and the flow rate measuring sensor 22a is disposed in front of the inhalation opening 11. The cylindrical portion 6 is provided on the inner peripheral wall surface of the large diameter portion 6b with threads 6d. The large diameter portion 6b includes an annular packing 6e that allows a rear end portion 3b of the filtering portion 3 to be press-contacted airtightly.

The filtering portion 3 is filled with a filtering element 3a, which serves as a filter, inside thereof. The filtering element 3a is formed of materials that are suitable to absorb at least one specific type of poisonous gas in the air 40. By "breakthrough time of filtering portion 3" regarding the mask 1 is meant a breakthrough time regarding the filtering element 3a. Threads 3d that are threadedly engaged with the cylindrical portion 6 are formed in a backward portion of a peripheral wall 3c of the filtering portion 3.

Upon inhalation of the wearer who wears the mask 1, the air 40 on the outside of the mask 1 passes through the filtering portion 3 into the mask 1, and the check valve 11a of the inhalation opening 11 is opened, which allows the wearer to inhale. Upon exhalation of the wearer, the check valve 11a is closed, and the check valve 12a of the exhalation opening 12 is opened, which allows the exhalation of the wearer to be discharged. When the arithmetic processing unit 25, the measuring units 21, 22, 23 and 24, the alarm 26a, and the display 27a are electrically turned on, the sensor 21a of the concentration measuring unit 21 detects the concentration of the poisonous gas present in the air 40 penetrating into the filtering portion 3, and the detection data are transmitted to the arithmetic processing unit 25. The sensor 23a of the temperature measuring unit 23 detects the temperature of the air 40, and the sensor 24a of the humidity measuring unit 24 detects the humidity of the air 40, and the detection data are transmitted to the arithmetic processing unit 25. In the back of the cylindrical portion 6, that is, on the downstream side of the filtering portion 3, the sensor 22a of the flow rate measuring unit 22, which is arranged in front of the inhalation opening 11, detects the flow rate of the air 40a that is purified by absorbing the poisonous gas through the filtering portion 3, and the detection data are transmitted to the arithmetic processing unit 25. The purified air 40a passes through the inhalation opening 11 into the facepiece 2 and used as air to be inhaled.

Regarding the filtering portion 3, it has generally been known that a maximum allowance concentration, which is provided as a threshold value or a control value with respect to a specific poisonous gas present in the air 40, is defined as breakthrough concentration, and the filtering capacity by which the concentration of the poisonous gas present in the air 40a can be kept equal to or lower than the threshold value or the control value is provided as a breakthrough time. It is necessary for the wearer of the mask 1 to monitor the mask 1 so as to precisely know the residual amount of the breakthrough time of the filtering portion 3 and to timely replace the filtering portion 3 in order to avoid an exposure to the poisonous gas due to the use of the filtering portion 3 used more than the breakthrough time and to prevent the health impairment.

As for the mask 1, with respect to the air 40 at a place where the mask 1 is used, when any of concentration of the poisonous gas $C_o$, a flow rate Q of the air 40 flown into the mask 1, a temperature T of the air 40, humidity RH of the air 40 is a constant value, the breakthrough time of the filtering portion 3 can be measured while obviating the measurement or the measuring unit with respect to the constant value. For example, when the flow rate Q, the temperature T, and the relative humidity RH are constant, the breakthrough time can be calculated by the mask 1 including only the concentration measuring unit 21, out of the measuring units 21, 22, 23 and 24. Also, in the environment where only the flow rate Q is changed, the breakthrough time can be calculated by the mask 1 including only the flow rate measuring unit 22.

The mask 1 exemplified in FIGS. 1 and 2 facilitates such management regarding the breakthrough time. The measuring units 21, 22, 23, and 24, and the arithmetic processing unit 25 are constituted as follows.

1. Concentration Measuring Unit 21

(1) The sensor 21a of the concentration measuring unit 21 is placed in a state in such a manner as to come into contact with the air 40 outside of the mask 1, preferably, in this state and in a state in such a manner as not to be affected by the exhalation.

(2) There is no specific provision regarding the sensor 21a, and various types of sensors may be used such as a constant-potential electrolysis type sensor, a PID sensor, a catalytic combustion type sensor, and an Orgastor type sensor. As one of concrete embodiments, Mini RAE 3000 (manufactured by RAE Systems, Inc.) that utilizes the PID sensor can be used as the concentration measuring unit 21.

2. Flow Rate Measuring Unit 22

(1) A flow meter is used in the sensor 22a of the flow rate measuring unit 22. There is no specific provision regarding the flow meter, and various types of flow meters can be used such as a throttle flow meter (Venturi meter), a differential pressure type flow meter (orifice flow meter), a hot-wire flow meter, an ultrasonic flow meter, and an impeller flow meter. It is possible to obtain the flow rate based on an area of a flow path and a current meter instead of the flow meter. As the current meter, various types of current meters can be used such as a hot-wire current meter, an electromagnetic current meter, a propeller type current meter, and an ultrasonic type current meter.

(2) It is preferable that the sensor 22a be arranged at a position illustrated in FIG. 2. However, the position can be changed to an appropriate position where the quantity of airflow in the filtering portion 3 can substantially be measured.

(3) When an electric fan to supply air to be breathed in is used for the mask 1, the flow rate can be obtained based on a current value or power consumption of the electric fan, the number of revolutions of a fan motor, and the like, instead of the use of the sensor 22a.

(4) Also, the opening degrees of the inhalation check valve 11a and the exhalation check valve 12a are detected by a proximity sensor and the like, and the flow rate is calculated based on the detection result, which serves as the substitution for the use of the sensor 22a.

(5) Further, a pressure response element like a diaphragm is attached on the facepiece 2, and a movement of the response element is detected by the proximity sensor and the like, and the flow rate is calculated based on the detected result, which serves as a substitution for the use of the sensor 22a.

(6) The variation in pressure in the facepiece is measured by a pressure gauge, and the flow rate is calculated based on the measurement result, which serves as the substitution for the use of the sensor 22a.

3. Temperature Measuring Unit 23

(1) It is preferable the sensor 23a of the temperature measuring unit 23 be in a state in such a manner as to come into contact with the air 40 outside of the mask 1 and be arranged in the vicinity of the filtering portion 3 and at a position where the sensor 23a is not affected by the flow of the air 40 flowing to the filtering portion 3 and the flow of air to be discharged from the exhalation opening 12. However, when the sensor 23a is a sensor that is not affected by the flow, the sensor 23a may be arranged in the vicinity of the filtering portion 3.

(2) There is no specific provision regarding the sensor 23a, and various types of thermometers can be used, for example, such as a semiconductor type temperature sensor, a band gap type temperature sensor, thermocouples, a resistance thermometer (resistance temperature detector, thermistor), and the like.

4. Humidity Measuring Unit 24

(1) It is preferable that the sensor 24a of the humidity measuring unit 24 be in a state in such a manner as to come into contact with the air 40, and be arranged at a position where the sensor 24a is not affected by the flow of the air 40 and the flow of air to be discharged, as is the same with the sensor 23a. However, when the sensor 24a is a sensor that is not affected by the flow, the sensor 24a may be arranged in the vicinity of the filtering portion 3.

(2) There is no specific provision regarding the sensor 24a, and various types of hygrometers can be used, for example, an electric hygrometer (capacitance type relative humidity sensor, a high molecular electric resistance type hygrometer, a ceramics type electric resistance hygrometer, and the like), a mechanical hygrometer (hair hygrometer), a psychrometer, and the like.

(3) SHT 75 manufactured by SENSIRION can be used as one example of the temperature-humidity measuring device including both the sensor 23a and the sensor 24a.

5. Arithmetic Processing Unit 25

(1) As shown in FIG. 1, when the measurement results or alternative signals in place of the measurement results are transmitted by wire from the measuring units 21, 22, 23, and 24, it is preferable that the arithmetic processing unit 25 be on the lumbar region or the pectoral region of the wearer of the mask 1. Unlike the example shown in FIG. 1, when the measurement results or the signals are transmitted by radio from the measuring units 21, 22, 23 and 24, the arithmetic processing unit 25 in a cordless state not only allows the wearer to carry the mask in use, but also allows persons other than the wearer to know the measurement results from each measuring unit or arithmetic processing results in a room such as a centralized control room that is apart from the wearer.

(2) Data can directly be input into the arithmetic processing unit 25 or indirectly be input from an external device whose body is separated from the arithmetic processing unit 25. For example, the arithmetic processing unit 25 has functions of executing setting of the breakthrough concentration of a specific poisonous gas in the air 40 in the filtering portion 3 by inputting the measurement results or the signals received from the measuring units 21, 22, 23 and 24, programming of the calculation formula such as a breakthrough-time prediction formula, calculation of a prediction breakthrough time based on the breakthrough-time prediction formula to be programmed, calculation of a degree of exhaustion of the filtering portion 3 per unit time, calculation of a residual use available time before the breakthrough time of the filtering portion 3 reaches that is obtained based on integration of the degree of exhaustion. When the residual use available time prior to the breakthrough time of the filtering portion 3 remains slightly, and attention needs to be paid to the wearer or a supervisor of the wearer, the arithmetic processing unit 25 can activate the alarm 26a and display various arithmetic results in the arithmetic processing unit 25, the measurement results of the measuring units 21, 22, 23 and 24, and the like on the display 27a. Also, when a name of a poisonous gas except for the specific poisonous gas or a relative breakthrough ratio corresponding to the specific poisonous gas is input, the arithmetic processing unit 25 can incorporate the input content into the calculation formula such as the breakthrough-time prediction formula regarding the specific poisonous gas. By "relative breakthrough ratio" as referred to in the present invention is meant a value that is obtained, based on a specific poisonous gas for which the breakthrough-time prediction formula is programmed as a reference gas, by dividing a measured breakthrough time of air including an arbitrary poisonous gas except for the reference gas by a measured breakthrough time of air including the reference gas whose concentration is the same as that of the arbitrary poisonous gas. Generally well-known poisonous gases such as cyclohexane and toluene may be selected as the reference gas. The relative breakthrough ratio may be represented in a formula 1 below.

(relative breakthrough ratio)=(breakthrough time of poisonous gas)/(breakthrough time of reference gas)   formula 1

(3) A microcomputer, a personal computer, a sequencer, and the like can be used for the arithmetic processing unit 25.

Figure 3:
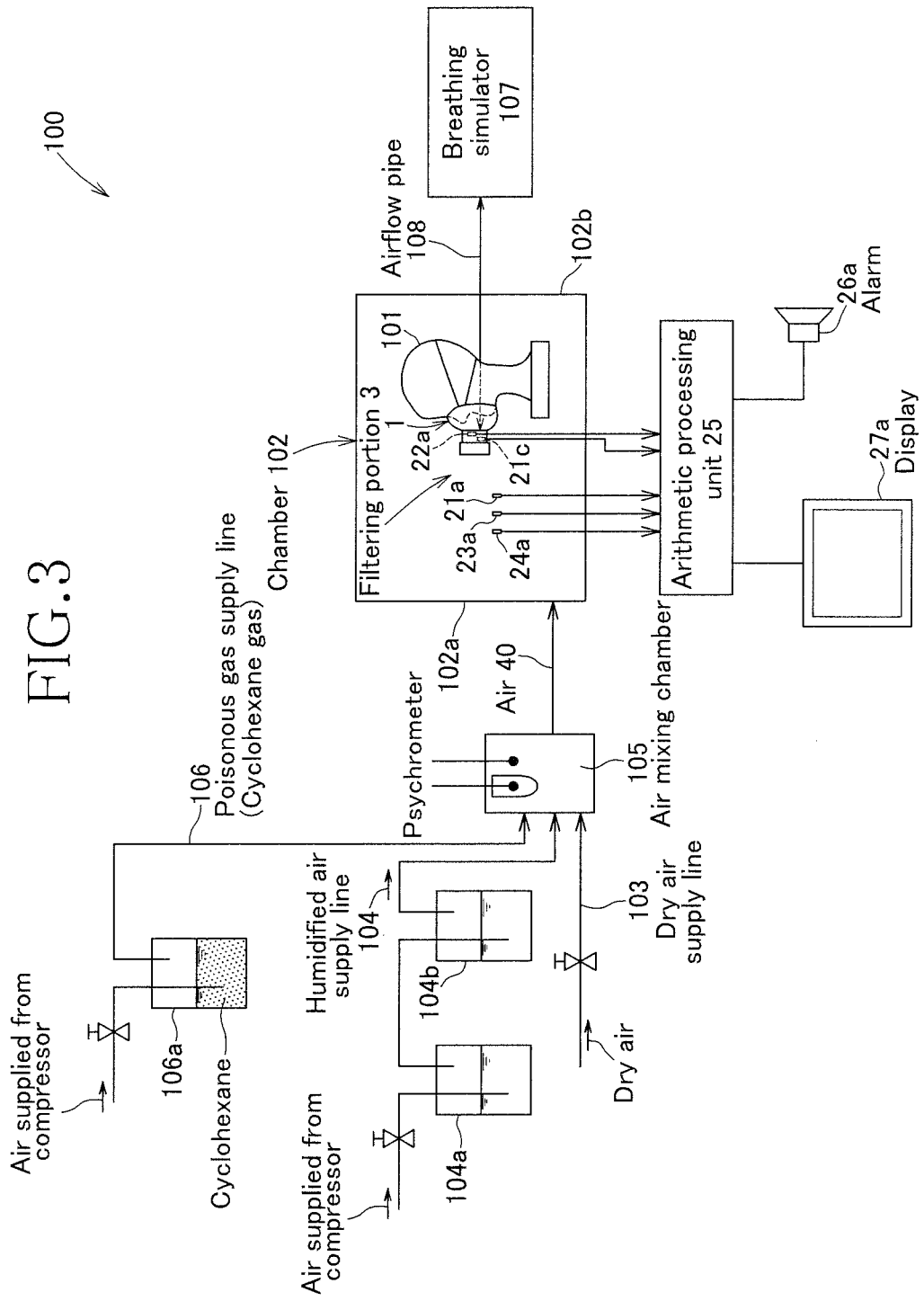
FIG. 3 is a schematic diagram illustrating a device to observe a breakthrough time of a gas mask.

FIG. 3 is a schematic diagram of a device 100 that can measure the breakthrough time of the filtering portion 3 of the gas mask 1 in FIG. 1. The device 100 includes a chamber 102 in which a human-head model 101 wearing the gas mask 1 is disposed, and an air mixing chamber 105 is provided on an upstream side 102a of the chamber 102. The air mixing chamber 105 is connected to a dry air supply line 103, a humidified air supply line 104, and a poisonous gas supply line 106. A breathing simulator 107 is provided on a downstream side 102b of the chamber 102, and the human-head model 101 and the breathing simulator 107 are connected via an airflow pipe 108. An upstream-side end portion of the airflow pipe 108 penetrates the human-head model 101 and reaches the mouth of the human-head model 101. The arithmetic processing unit 25, the alarm 26a, and the display 27a are provided on the outside of the chamber 102. The arithmetic processing unit 25 is electrically connected to the concentration measuring sensor 21a arranged in the vicinity of the filtering portion 3 in the inside of the chamber 102, the temperature measuring sensor 23a, the humidity measuring sensor 24a, the flow rate measuring sensor 22a arranged in the inside of the gas mask 1.

In the dry air supply line 103, dry air is supplied from a compressor (not shown) to the air mixing chamber 105.

In the humidified air supply line 104, the dry air transferred from the compressor (not shown) passes through water storage tanks 104a and 104b and turns into humidified air, which is supplied to the air mixing chamber 105.

In the poisonous gas supply line 106, the dry air transferred from the compressor (not shown) enters the tank 106a. For example, the tank 106a contains liquid cyclohexane, and the dry air is discharged into the liquid of the cyclohexane, whereby the liquid of the cyclohexane in the tank 106a vaporizes and turns into air contaminated with, in other words, polluted with cyclohexane gas, which is a poisonous gas, and the air is directed to the air mixing chamber 105.

In the air mixing chamber 105, a room temperature is set to the same temperature as a temperature at which the breakthrough time or the like is measured. In the air mixing chamber 105, the dry air, the humidified air, and the air contaminated with the poisonous gas are mixed so as to include the poisonous gas having the concentration required to measure the breakthrough time, whereby turning into the air 40 in which the temperature and humidity are adjusted to a constant value, and the air 40 is directed to the chamber 102.

The breathing simulator 107 arranged on the downstream side 102b of the chamber 102 can iterate the inhalation operation and the exhalation operation with the air flow rate adjusted and change the number of iterations per one minute between the inhalation operation and the exhalation operation. Further, the breathing simulator 107 can continuously carry out the inhalation operation in such a manner as to successively provide the filtering portion 3 with the air 40 having a constant flow rate per unit time.

In the present invention, the device 100 was used to observe the breakthrough time of the filtering portion 3 of the gas mask 1, and the cyclohexane was used as the poisonous gas, and an organic gas canister KGC-1S (filtering element having 78 mm in diameter and 11.5 mm in thickness) manufactured by Koken Ltd. was attached as the filtering portion 3 of the gas mask 1 arranged in the human-head model 101, and a second concentration detection sensor 21c (see FIG. 2) to detect the concentration of the poisonous gas contained in the air 40a after passing through the filtering portion 3 was arranged in the vicinity of the sensor 22a on the downstream side of the filtering portion 3. In the chamber 102, by detecting the concentration of the poisonous gas before and after the air 40 containing the poisonous gas (cyclohexane) having specified concentration passes through the filtering portion 3, the inventors of the present invention acquired findings concerning the influence of the concentration Co of the poisonous gas in the air 40, the flow rate Q of the air 40 passing through the filtering portion 3, the temperature T of the air 40, and the relative humidity RH of the air 40 on the breakthrough time BT of the filtering portion 3 and concerning the prediction of the breakthrough time BT of the filtering portion 3. It should be noted that the second concentration detection sensor 21c is electrically connected to the arithmetic processing unit 25 and its connection state is illustrated in an imaginary line in FIG. 2. Table 1 shows items for examination on the air 40, and conditions such as the concentration Co (ppm), the flow rate Q (L/min, L: liters), breakthrough reference (%), the temperature (° C.), and the relative humidity (% RH), which are selected for each item to be examined.

a, b constants experimentally obtained with the concentration Co at least on two levels

TABLE 2

| Test concentration $C_0$ [ppm] | 1% Breakthrough concentration [ppm] | 1% Breakthrough time (concentration) 1% BTc [min] |
|---|---|---|
| 100 | 1 | 235.0 |
| 300 | 3 | 100.3 |
| 600 | 6 | 64.0 |
| 1000 | 10 | 41.4 |
| 1200 | 12 | 35.2 |
| 1800 | 18 | 22.8 |

Average value in the case of n = 3

Finding 2.

The flow rate Q under the reference conditions was changed on several levels, and on each level, for example, a time during which % breakthrough concentration reaches 1% breakthrough concentration was measured. If the time is

TABLE 1

| | | Test condition | | | | | |
|---|---|---|---|---|---|---|---|
| Examination items on air 40 | Filtering portion | Test gas (Poisonous gas element) | Concentration $C_0$ [ppm] | Flow rate Q [L/min] | Breakthrough concentration [%] | Temperature T [° C.] | Relative humidity RH [% RH] |
| Influence on concentration | Canister KGC-1S | Cyclohexane | 100~1800 | 30 | 1 | 20 | 50 |
| Influence on flow rate | manufactured by | | 300 | 30-120 | 1 | 20 | 50 |
| Influence on temperature/humidity | KOKEN LTD. | | 300 | 30 | 1 | 15~35 | 9~80 |
| Examination on change from % breakthrough concentration to Arbitrary breakthrough concentration | (Filtering member having 78 mm in diameter and 11.5 mm in thickness) | | 100~1800 | 30~120 | 0.5~10 | 20 | 50 |

% Breakthrough concentration (Ex.)
1% Breakthrough concentration of test concentration of 100 ppm: 1 ppm
1% Breakthrough concentration of test concentration of 600 ppm: 6 ppm Finding 1.

Figure 4:
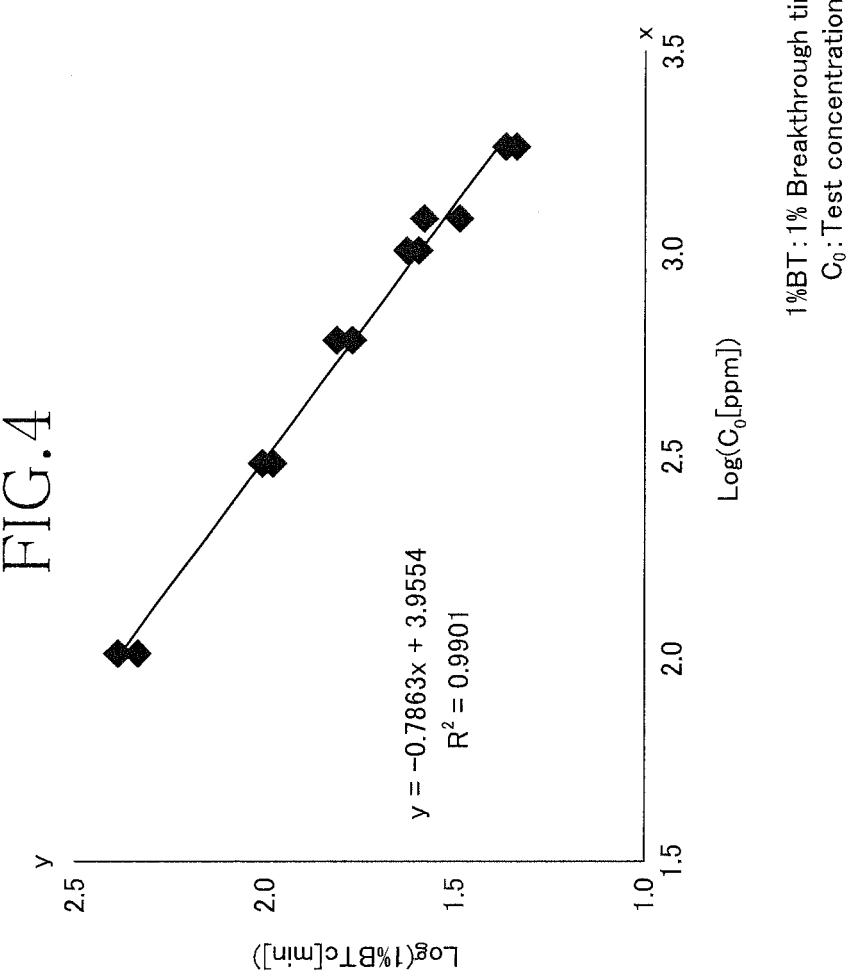
FIG. 4 is a graph illustrating a relation between test concentration and 1% breakthrough time.
Figure 5:
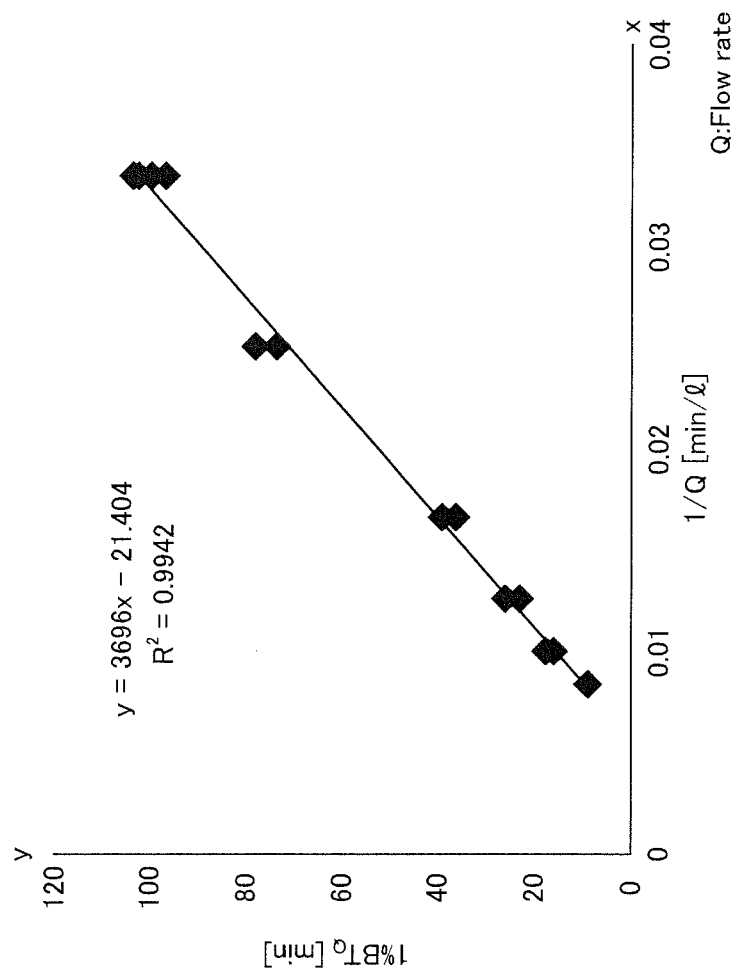
FIG. 5 is a graph illustrating a relation between a flow rate and the 1% breakthrough time.

Reference conditions (four conditions such as the concentration Co that was set to an arbitrary value, the flow rate Q, the temperature T, and the relative humidity RH, and under the four conditions, a ratio (for example A %) of the concentration of the poisonous gas leaked out to the downstream side of the filtering portion 3 to the concentration Co (hereinafter referred to as % breakthrough concentration or A % breakthrough concentration) were specified, and the concentration Co under the reference conditions was changed on several levels, and on each level, for example, a time during which % breakthrough concentration (for example A % breakthrough concentration) reaches 1% breakthrough concentration was measured, and if the time was assumed as 1% breakthrough time depending on the concentration (abbreviation: 1% breakthrough time (concentration) or 1% $BT_c$, or concentration variation ratio), 1% $BT_c$ tended to be shorter as the level of the concentration Co increases. Table 2 shows 1% $BT_c$ measured on each level of the concentration Co. FIG. 4 shows a logarithmic relation between the concentration Co and 1% $BT_c$ of the Table 2. This relation regarding concentration variation, that is, concentration variation ratio may be expressed by mathematical formulas such as logarithmic approximation, inverse proportion approximation, power approximation, and the like. As one example, 1% $ET_c$ obtained by the logarithmic approximation is expressed by a formula 2.

$$1\% \ BT_c = Co^a \times 10^b \qquad \text{formula 2}$$

assumed as 1% breakthrough time depending on the flow rate (abbreviation: 1% breakthrough time (flow rate) or 1% $BT_Q$, or flow rate variation ratio of breakthrough time), 1% $BT_Q$ tended to be shorter as the flow rate Q increased. Table 3 shows 1% $BT_Q$ measured on each level of the flow rate Q. FIG. 5 shows an inverse proportional relation between the flow rate Q and 1% $BT_Q$ of Table 3. This relation regarding flow rate variation, that is, the flow rate variation ratio may be expressed by mathematical formulas such as logarithmic approximation, inverse proportion approximation, power approximation, and the like. As one example, 1% $BT_Q$ obtained by the inverse proportion approximation can be expressed by a formula 3.

$$1\% \ BT_Q = c \times 1/Q + d \qquad \text{formula 3}$$

c, d: constants experimentally obtained with the flow rate Q at least on two levels

TABLE 3

| Flow rate Q [L/min] | 1% Breakthrough time (Flow rate) 1% $BT_Q$ [min] |
|---|---|
| 30 | 100.3 |
| 40 | 74.8 |
| 60 | 37.4 |

TABLE 3-continued

| Flow rate Q [L/min] | 1% Breakthrough time (Flow rate) 1% $BT_Q$ [min] |
|---|---|
| 80 | 24.7 |
| 100 | 16.3 |
| 120 | 8.8 |

Average value in the case of n = 3

Finding 3.

Figure 6:
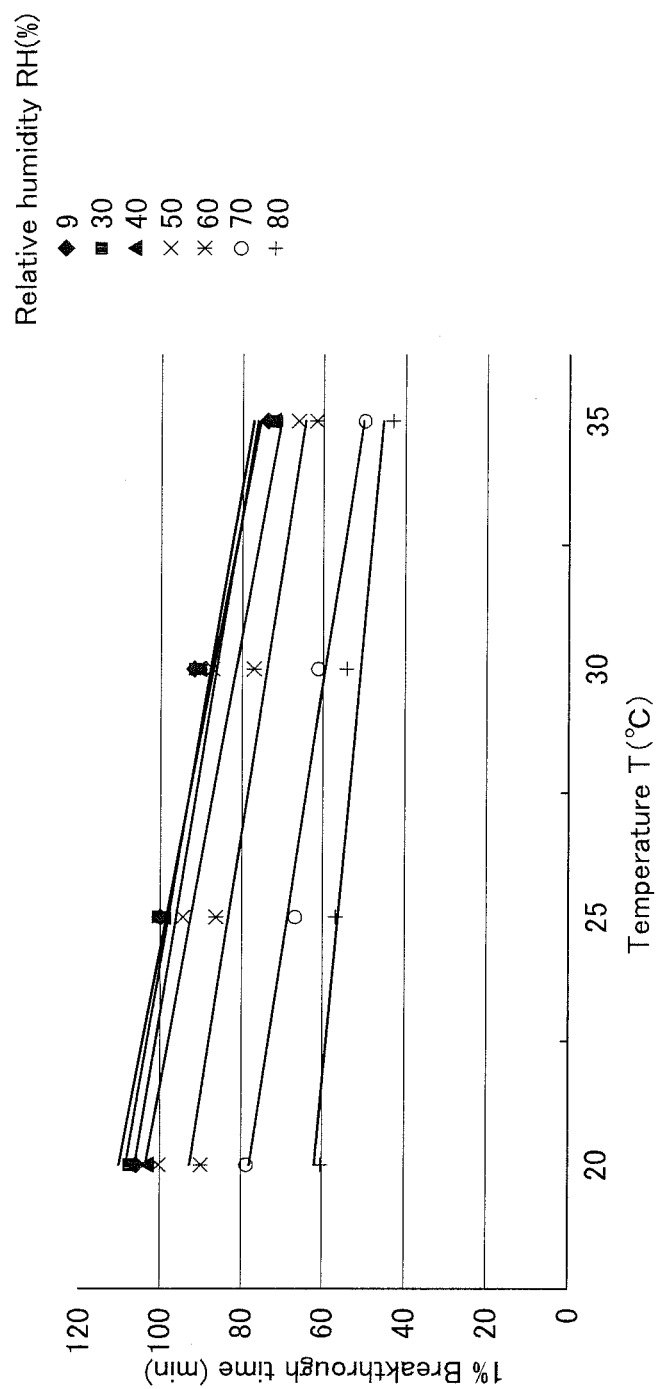
FIG. 6 is a graph illustrating a relation between a temperature and the 1% breakthrough time.

Table 4 shows 1% breakthrough time observed at a time when the temperature T and the relative humidity % RH were changed in conditions that the concentration Co was 300 ppm, and the flow rate Q was 30 L/min. FIG. 6 shows that, when the concentration Co, the flow rate Q, and relative humidity RH are constant in Table 4, and the temperature T increases, the breakthrough time tends to be shorter. The tendency of the temperature variation, which is linear as shown in FIG. 6, may be expressed by mathematical formulas. For example, when a ratio of breakthrough time (hereinafter referred to as a temperature influence coefficient or a temperature variation ratio) is obtained based on the breakthrough time at a temperature of 20° C. as a reference, the temperature influence coefficient may be expressed by a formula 4.

temperature influence coefficient=$g \times T + h$   formula 4 g, h: constants experimentally obtained with the temperature at least on two levels The formula 4 may be referred to as a temperature correction formula that is required to calculate the breakthrough time of the filtering portion 3.

TABLE 4

| | | Temperature T[° C.] | | | |
|---|---|---|---|---|---|
| | | 20.0 | 25.0 | 30.0 | 35.0 |
| Relative humidity RH [% RH] | 9 | 105.8 | 99.8 | 92.0 | 73.7 |
| | 30 | 107.2 | 100.6 | 91.5 | 71.7 |
| | 40 | 102.7 | 99.1 | 90.3 | 72.2 |
| | 50 | 100.3 | 94.3 | 87.0 | 65.9 |
| | 60 | 89.6 | 86.0 | 76.7 | 61.4 |
| | 70 | 78.8 | 66.9 | 61.0 | 49.9 |
| | 80 | 60.3 | 56.9 | 54.2 | 42.9 |

Concentration Co: 300 ppm
Flow rate Q: 30 L/min

Finding 4.

Figure 7:
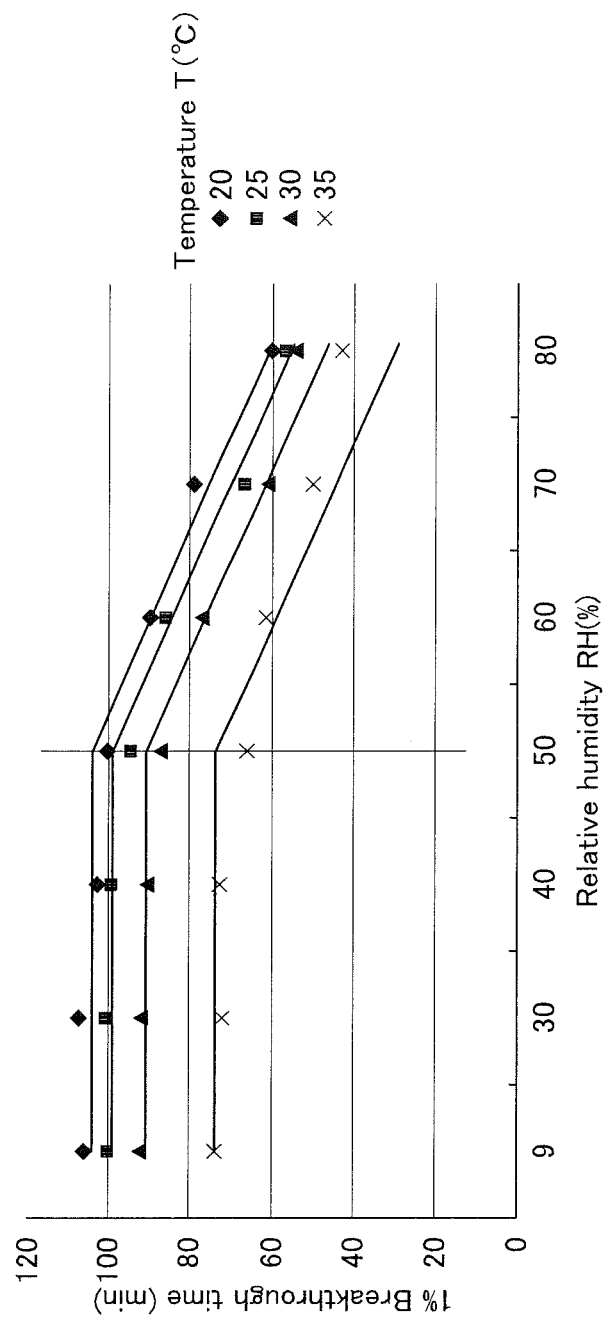
FIG. 7 is a graph illustrating a relation between relative humidity and the 1% breakthrough time.

As is evident in the Table 4, when the concentration Co, the flow rate Q, and the temperature T were constant, and the relative humidity RH was equal to or higher than 50%, the breakthrough time tended to be shorter as the relative humidity RH increases. The tendency of the humidity variation, which is linear as shown in FIG. 7, may be expressed by mathematical formulas. For example, when a ratio of breakthrough time (hereinafter referred to as, humidity influence coefficient or humidity variation ratio in the case of RH≥50%) is obtained based on the breakthrough time at which the relative humidity RH is 50% as a reference, the humidity influence coefficient may be expressed by a formula 5.

humidity influence coefficient in case where RH is ≥50%=$e \times RH + f$   formula 5 e, f: constants experimentally obtained with the relative humidity RH at least on two levels (however, which include one level of a case where the relative humidity RH is equal to or higher than 50%)

The formula 5 can be referred to as a humidity correction formula that is required to calculate the breakthrough time of the filtering portion 3.

Also, as is evident in the Table 4 and FIG. 7, when the relative humidity RH was less than 50%, the breakthrough time was hardly changed, even if the relative humidity RH was changed. The breakthrough time was nearly equal to a breakthrough time in the case where the relative humidity RH was 50%. This tendency (hereinafter referred to as a humidity influence coefficient or a humidity variation ratio in the case of RH≤500) may be expressed by a formula 6.

humidity influence coefficient in case where RH is ≤50%=1   formula 6

Finding 5.

When the temperature T and the relative humidity RH were constant, and the concentration Co and the flow rate Q were changed, the relation of 1% breakthrough time depending on the concentration and the flow rate that are the predictive values of the breakthrough time before reaching breakthrough concentration 1% (abbreviation: 1% breakthrough time (concentration, flow rate)) to 1% $BT_c$ of the formula 2 and 1% $BT_Q$ of the formula 3 was shown by a formula 7.

1% breakthrough time(concentration,flow rate)=(1% $BT_c$/reference BT)×(1% $BT_Q$/reference BT)× reference BT=1% $BT_c$×1% $BT_Q$×1/reference BT   formula 7

Reference BT: breakthrough time regarding the reference conditions of Finding 1. For example, 1% breakthrough time (concentration) (1% $BT_c$) is meant that is obtained by assigning to the formulas 2 and 3 the concentration Co, the flow rate Q, the temperature T, and the relative humidity RH, which are common to the formulas 2 and 3. A value of 1% $BT_c$ in this time is equal to a value of 1% breakthrough time (flow rate) (1% $BT_Q$). The embodiment of the reference condition is such that, Co=300 ppm, Q=30 L/min, T=20° C., RH=50%, 1% breakthrough concentration. The embodiment of the reference BT is 1% $BT_c$ (=1% $BT_Q$) obtained based on the reference condition.

Finding 6.

when the concentration Co, the flow rate Q, the temperature T, and the relative humidity RH are changed with respect to the reference conditions of the Finding 1, a predictive value (1% breakthrough time) of the breakthrough time before reaching 1% breakthrough concentration on the downstream side of the filtering portion 3 is shown by the relation expressed by formulas 8-1 and 8-2.

1% breakthrough time=reference breakthrough time× concentration variation ratio×flow rate variation ratio×temperature variation ratio×humidity variation ratio   formula 8-1

1% breakthrough time=1/reference BT×1% $BT_c$×1% $BT_Q$×temperature variation ratio×humidity variation ratio   formula 8-2

Finding 7.

Figure 8:
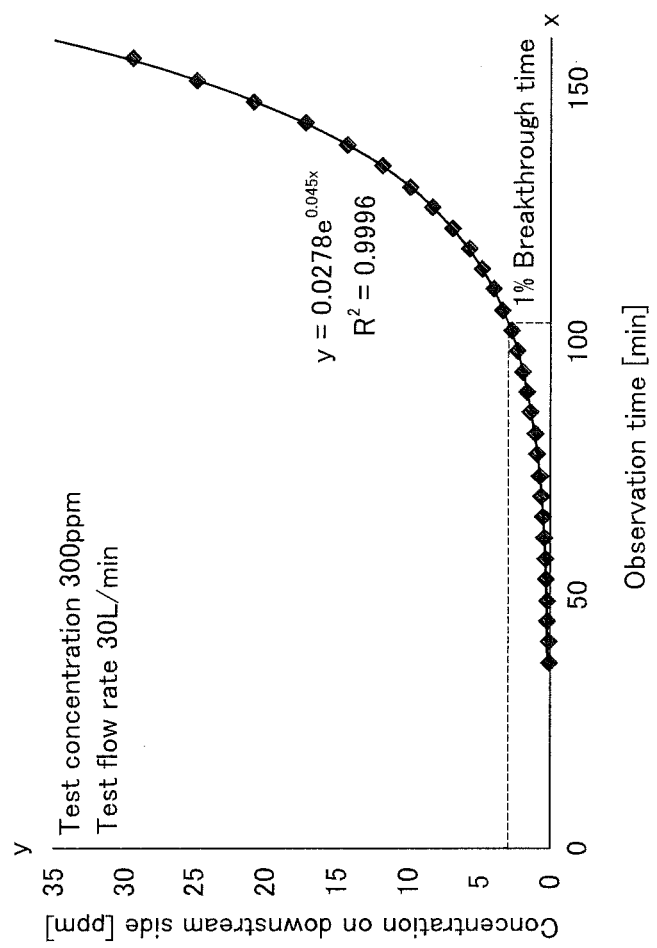
FIG. 8 is a graph illustrating a relation between an observation time and the concentration on a downstream side.

(1) About Breakthrough Concentration Having Arbitrary Value and Concentration Co a. The concentration of the poisonous gas (cyclohexane) on the downstream side of the filtering portion 3 in the case of the concentration Co=300 ppm and the flow rate Q=30 L/min has increased with the lapse of observational time. FIG. 8 shows the way the concentration increased, and 1% breakthrough time in FIG. 8 was 100.3 minutes.

b. The flow rate Q was fixed to 30 L/min, and the concentration of the poisonous gas on the downstream side, which is regarded as the breakthrough of the filtering portion 3, was set to an arbitrary value (%) with respect to the concentration Co on the upstream side of the filtering portion 3, for example, to 0.5, 1, 3, 5, and 10%, and the breakthrough time (% breakthrough time) of the arbitrary value (%) was measured. As for the concentration Co on the upstream side, its level was changed from 100 to 1800 ppm, and on each level, a ratio of % breakthrough time to 1% breakthrough time out of % breakthrough time (% breakthrough concentration influence ratio (concentration) or concentration variation ratio) was obtained, and its result is shown in Table 5.

c. Table 5 shows that % breakthrough time was not affected by the concentration Co on the upstream side if % breakthrough time was seen in the form of % breakthrough concentration influence ratio (concentration).

Figure 9:
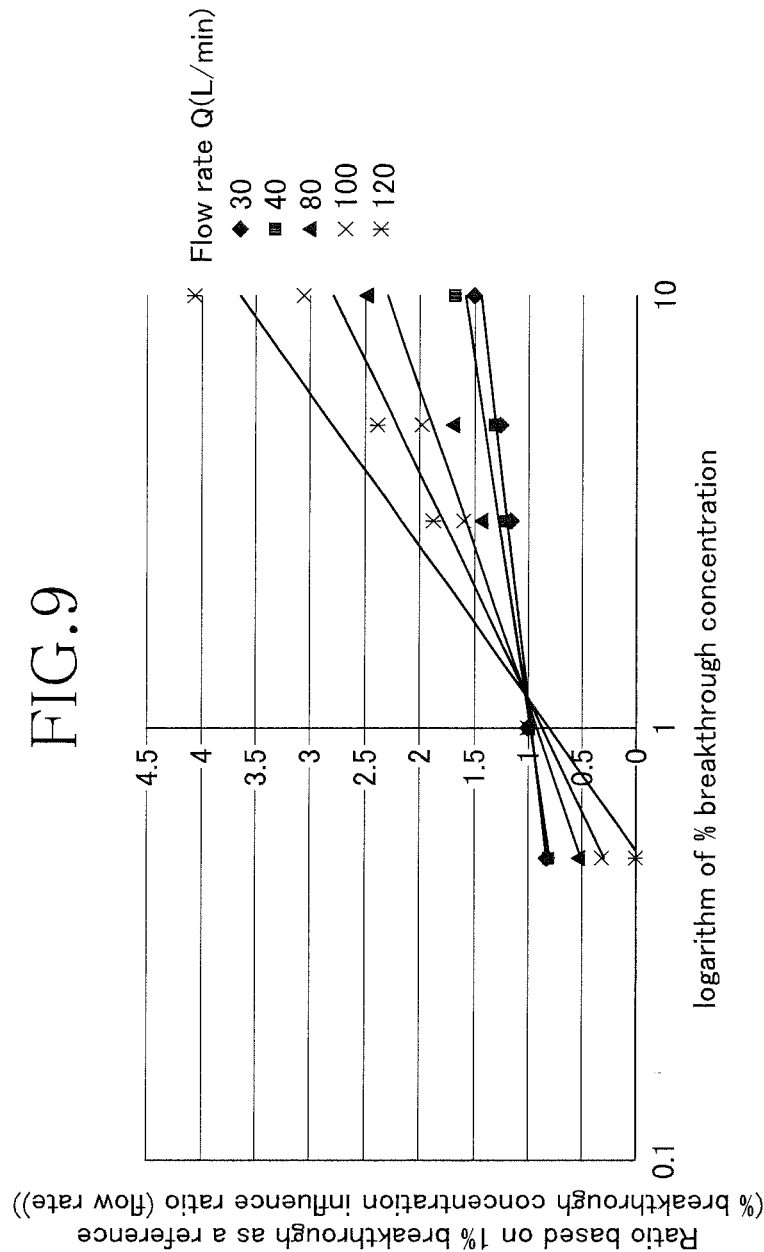
FIG. 9 is a graph illustrating a relation between % breakthrough time and % breakthrough concentration influence ratio (flow rate).
Figure 10:
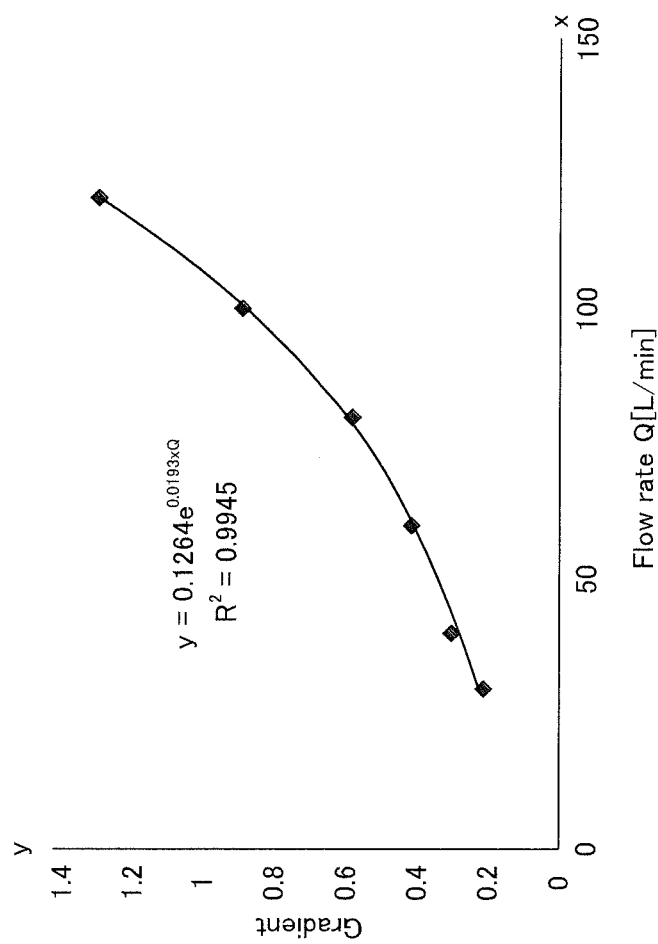
FIG. 10 is a graph illustrating a state where a gradient of a straight line changes in accordance with the flow rate.

(2) About Breakthrough Concentration Having Arbitrary Value and Flow Rate Q a. The concentration Co on the upstream side was kept constant, and the flow rate Q through the filtering portion 3 was changed, and the concentration of the poisonous gas on the downstream side, which is regarded as the breakthrough of the filtering portion 3, was set to an arbitrary value (%) with respect to the concentration Co, for example, to 0.5, 1, 3, 5, and 10%, and the breakthrough time (% breakthrough time) of the arbitrary value (%) was measured. As one example, the concentration Co was fixed to 100 ppm, and the level of the flow rate Q was changed from 30 to 120 L/min, and on each level, a ratio of % breakthrough time to 1% breakthrough time (1% ET) out of % breakthrough time (% BT) (% breakthrough concentration influence ratio (flow rate)) was obtained, and its result is shown in Table 6.

b. Table 6 shows a relation between the level of the flow rate Q and % breakthrough time of the case where the concentration Co is 100 ppm. Regarding % breakthrough time that is seen in the form of % breakthrough concentration influence ratio (flow rate), it has been found that, when the level of the flow rate Q is changed, % breakthrough concentration influence ratio (flow rate) is also changed.

c. In Table 6, the relation between % breakthrough concentration influence ratio (flow rate) for each % breakthrough concentration and % logarithm regarding % breakthrough concentration was illustrated in a straight line as shown in FIG. 9, and the gradient of the straight line was changed with respect to the flow rate Q as shown in FIG. 10.

d. Based on Table 6 and FIG. 10, it has been found that the flow rate Q, % breakthrough concentration, and the ratio of % breakthrough time to 1% breakthrough time (% breakthrough concentration influence ratio (flow rate) or breakthrough time ratio of arbitrary breakthrough concentration S ppm) have a relation as shown in a formula 9.

ratio of ($S$ ppm breakthrough time) to (1% BT)=$i \times EXP^{j \times Q} \times Ln(S/Co \times 100)+1)$     formula 9

$i, j$: a constant obtained in such a manner that the concentration Co, the temperature T, and the relative humidity RH are kept constant, and the flow rate Q is changed at least on three levels, and on each level of the flow rate Q, a ratio of (% breakthrough time) to (1% BT) is acquired (however, the breakthrough concentration is not limited to 1%, and generally speaking, when values of A and B are different from each other, it can be said that the constants are obtained by acquiring a ratio of B % breakthrough time to A % breakthrough time on each level of the flow rate Q).

S arbitrary breakthrough concentration of filtering portion 3 (unit ppm) S/Co×100: % breakthrough concentration The formula 9 may be referred to as a breakthrough reference correction formula, wherein $i \times EXP^{j \times Q}$ may be expressed by linear approximation, power approximation, and the like, in addition to exponential approximation.

TABLE 5

| Flow rate Q | Concentration $C_0$ | Ratio of % breakthrough time to 1% breakthrough time (% Breakthrough concentration influence ratio (concentration)) | | | | |
|---|---|---|---|---|---|---|
| [L/min.] | [ppm] | 0.5% | 1% | 3% | 5% | 10% |
| 30 | 100 | 0.83 | 1.00 | 1.24 | 1.36 | 1.50 |
|  | 300 | 0.85 | 1.00 | 1.24 | 1.35 | 1.50 |
|  | 600 | 0.85 | 1.00 | 1.23 | 1.33 | 1.48 |
|  | 1000 | 0.84 | 1.00 | 1.23 | 1.34 | 1.50 |
|  | 1200 | 0.85 | 1.00 | 1.24 | 1.35 | 1.53 |
|  | 1800 | 0.85 | 1.00 | 1.23 | 1.34 | 1.51 |

TABLE 6

| Flow rate Q | Concentration $C_0$ | Ratio of % breakthrough time to 1% breakthrough time (% Breakthrough concentration influence ratio (flow rate)) | | | | |
|---|---|---|---|---|---|---|
| [L/min] | [ppm] | 0.5% | 1% | 3% | 5% | 10% |
| 30 | 100 | 0.83 | 1.00 | 1.15 | 1.24 | 1.50 |
| 40 |  | 0.81 | 1.00 | 1.21 | 1.31 | 1.69 |
| 80 |  | 0.53 | 1.00 | 1.44 | 1.70 | 2.49 |
| 100 |  | 0.31 | 1.00 | 1.60 | 1.97 | 3.05 |
| 120 |  | — | 1.00 | 1.88 | 2.39 | 4.06 |

Finding 8.

Finding 7 shows that, if 1% breakthrough time, which is a predictive breakthrough time in the case where the breakthrough concentration of the filtering portion 3 is 1% of the upstream concentration Co, is determined, and the breakthrough concentration of the filtering portion 3 is set to an arbitrary value, the predictive breakthrough time with respect to the arbitrary value can be obtained by a formula 10 below.

breakthrough time=reference breakthrough time concentration variation ratio×flow rate variation ratio×temperature variation ratio×humidity variation ratio×breakthrough concentration variation ratio formula     10

In the formula 10;

reference breakthrough time: a duration time during which the concentration on the downstream side of the filtering portion reaches A % that is a value that is less than 100% and arbitrarily set as the breakthrough concentration with respect to the concentration Co, in the case where the concentration Co, the flow rate Q, the temperature T, and the relative humidity RH are kept constant, concentration variation ratio: a correction coefficient with respect to concentration variation calculated by obtaining the reference breakthrough times for the concentration Co at least on two levels while the flow rate, the temperature, and the humidity are kept constant, flow rate variation ratio: a correction coefficient with respect to flow rate variation calculated by obtaining the reference breakthrough times for the flow rate Q at least on two levels while the concentration, the temperature, and the humidity are kept constant, temperature variation ratio: a correction coefficient with respect to temperature variation calculated by obtaining the reference breakthrough times for the temperature T at least on two levels while the concentration, the flow rate, and the relative humidity are kept constant, humidity variation ratio: a correction coefficient with respect to humidity variation calculated by obtaining the reference breakthrough times for at least two levels including one level at which the level of the relative humidity RH is equal to or higher than 50% while the concentration, the flow rate, and the temperature are kept constant, breakthrough concentration variation ratio: a correction coefficient with respect to breakthrough concentration variation calculated by obtaining A % breakthrough times corresponding to breakthrough concentration A % obtained with respect to the flow rate Q at least on three levels, and B % breakthrough time corresponding to breakthrough concentration B % that is different from the breakthrough concentration A % on one level out of the three levels of flow rate Q while the concentration, the temperature, and the humidity are kept constant.

Finding 9.

The formulas 2 to 9 and the predictive value of the breakthrough time of the breakthrough concentration whose unit is ppm are expressed by the formulas 11-1 and 11-2 below, when the concentration of the poisonous gas on the upstream side of the filtering portion 3 is provided as Co ppm, and the breakthrough concentration of the filtering portion 3 is provided as S ppm.

predictive breakthrough time during which the downstream side concentration reaches S ppm in the case of RH≥50% (abbreviation: S ppm BT):

$$S \text{ ppm BT}=1/\text{Reference BT} \times (Co^a \times 10^b) \times (c \times 1/Q+d) \times (i \times \text{EXP}^{j \times Q} \times \text{Ln}(S/Co \times 100)+1) \times (e \times \text{RH}+f) \times (g \times T+h) \qquad \text{formula 11-1}$$

predictive breakthrough time during which the downstream side concentration reaches S ppm in the case of RH<50% (abbreviation: S ppm BT):

$$S \text{ ppm BT}=1/\text{reference BT} \times (Co^a \times 10^b) \times (c \times 1/Q+d) \times (i \times \text{EXP}^{j \times Q} \times \text{Ln}(S/Co \times 100)+1) \times (g \times T+h) \qquad \text{formula 11-2}$$

Finding 10.

The Findings 1 to 9 are also applicable to organic poisonous gases other than the cyclohexane. As is the same case with the cyclohexane, regarding the poisonous gases other than the cyclohexane, a breakthrough prediction formula may be calculated for each poisonous gas through the application of the Findings 1 to 9. However, where a poisonous gas whose relative breakthrough ratio with respect to the cyclohexane is known, the breakthrough time can be calculated by assigning a value multiplied by the relative breakthrough ratio to the breakthrough time concerning the cyclohexane. Also, as is the same case with the cyclohexane, when the breakthrough-time prediction formula for a specific poisonous gas other than the cyclohexane is calculated, a gas whose relative breakthrough ratio with respect to the breakthrough time concerning the specific poisonous gas is evident, the breakthrough time of the gas can be calculated by assigning a value multiplied by the relative breakthrough ratio to the breakthrough time concerning the specific poisonous gas to the breakthrough prediction formula.

The formulas 11-1 and 11-2 are programmed in the arithmetic processing unit 25 of FIG. 1 and programmed in such a manner that the formula 11-1 is selected in the case of RH≥50% and the formula 11-2 is selected in the case of RH<50%. Instead of being programmed in this way, only the formula 11-1 may be programmed in the arithmetic processing unit 25. In this case, the arithmetic processing unit 25 is programmed in such a manner that the formula 11-1 is selected in the case of RH≥50%, and RH=50% is selected in the formula 11-1 in the case of RH<50%.

As for the mask 1 of FIG. 1 under the conditions where the formulas 2, 3, 4, 5, 6, 7, 8-2, 9, 11-1, and 11-2 have been programmed in the arithmetic processing unit 25, the canister KGC-1S (filtering element having 78 mm in diameter and 11.5 mm in thickness) manufactured by Koken Ltd. was used for the filtering portion 3 of the mask 1, and the cyclohexane was used as the poisonous gas, and the concentration Co of the poisonous gas, the flow rate Q of the air 40, the temperature T of the air 40, the relative humidity RH of the air 40 were changed so as to observe the breakthrough time of the filtering portion 3, and their results are shown in (1) to (9) below.

(1) The air 40 having the temperature T=20° C. and the relative humidity RH=50% was passed through the filtering portion 3 at a rate of the flow rate Q=30 L/min. The concentration Co of the poisonous gas in the air 40 is changed on six levels such as 100 ppm, 300 ppm, 600 ppm, 1000 ppm, 1200 ppm, and 1800 ppm. The 1% breakthrough time (concentration) (1% $BT_c$), which is a duration time during which the poisonous gas leaked out to the downstream side of the filtering portion 3 reaches 10 of the concentration Co, was input to the arithmetic processing unit 25 and, with respect to the formula 2 programmed in the arithmetic processing unit 25, the following formula 12 was obtained.

$$1\% \text{ BT}c=Co^{-0.7863} \times 10^{3.9554} \qquad \text{formula 12}$$

(2) The air 40 having the temperature T=20° C. and the relative humidity RH=50% and containing the poisonous gas having the concentration Co=300 ppm was passed through the filtering portion 3 at the flow rate Q on six levels such as 30 L/min, 40 L/min, 60 L/min, 80 L/min, 100 L/min, 120 L/min, and 1% $BT_Q$ on each level was input to the arithmetic processing unit 25 and, with respect to the formula 3 programmed in the arithmetic processing unit 25, the following formula 13 was obtained.

$$1\% \text{ BT}_Q=3696 \times 1/Q-21.404 \qquad \text{formula 13}$$

(3) In the formulas 12 and 13 that were provided as T=20° C., RH=50%, Co=300 ppm, Q=30 L/min, 1% $BT_c$ and 1% $BT_Q$ which were obtained by the arithmetic processing unit 25, are 98.8 minutes. When 1% $BT_c$ (which is equal to 1% $BT_Q$) under this condition was regarded as a reference BT, the breakthrough time in the case where the concentration Co and the flow rate Q were changed at T=20° C. and RH=50% could be calculated by the formula 7 described before.

$$1\% \text{ breakthrough time (concentration, flow rate)}=1\% \text{ BT}_c \times 1\% \text{ BT}_Q \times 1/\text{Reference BT} \qquad \text{formula 7}$$

(4) In the formula 7 programmed in the arithmetic processing unit 25, the conditions of T=20° C., RH=50%, Co=600 ppm, and Q=40 L/min were input to obtain a predictive breakthrough time on calculation, which resulted in 41.8 minutes. On the other hand, when the air 40 was passed through the filtering portion 3 of the mask 1 in FIG. 1 under the conditions of T=20° C., RH=50%, Co=600 ppm, and Q=40 L/min, and 1% breakthrough time, which was a duration time during which the concentration of the poisonous gas on the downstream side of the filtering portion 3 reaches 1% of the concentration Co on the upstream side, that is, 6 ppm, was measured, the 1% breakthrough time was 38.9 minutes, which approximately corresponded with a predictive breakthrough time that is 1% breakthrough time (concentration, flow rate) on calculation.

(5) Regarding the mask 1 under the condition of RH=50%, Co=300 ppm, and Q=30 L/min, BT was measured on five levels of the temperatures T such as T=15° C., 20° C., 25° C., 30° C., and 35° C., and the measurement results were input to the arithmetic processing unit 25, and a formula 14 below was obtained with respect to the formula 4 programmed in the arithmetic processing unit 25.

$$\text{temperature influence coefficient}=-0.0209 \times T+1.4199 \qquad \text{formula 14}$$

(6) Regarding the mask 1 under the condition of T=20° C., Co=300 ppm, and Q=30 L/min, 1% BT was measured on eight levels of the relative humidity RH such as RH=10%, 20%, 30%, 40%, 50%, 60%, 70%, and 80%, and the measurement results were input to the arithmetic processing unit 25, and a formula 15 was obtained with respect to the formula 5 programmed in the arithmetic processing unit 25 in the case of RH≥50%. Also, in the case of R<50%, the relative humidity influence coefficient was applied to the formula 6 described before.

humidity influence coefficient in case of RH≥50%,=−0.0124×RH+1.6223    formula 15 humidity influence coefficient in case of RH<50%=1    formula 6

(7) The condition of T=35° C., RH=70%, Co=300 ppm, and Q=30 L/min was input to the arithmetic processing unit 25, and 1% predictive breakthrough time calculated based on the formulas 8-2, 14, and 15 programmed in the arithmetic processing unit 25 was 50.8 minutes. On the other hand, when the air 40 is passed through the filtering portion 3 of the mask 1 under the condition of T=35° C., RH=70%, Co=300 ppm, and Q=30 L/min, the breakthrough time with respect to 1% of breakthrough concentration actually measured is 49.9 minutes, which approximately corresponds with a predictive breakthrough time on calculation.

(8) When the air 40 of T=20° C., RH=50%, Co=300 ppm, and Q=30 L/min was passed through the filtering portion 3 of the mask 1, a duration time was measured during which the concentration of the poisonous gas leaked out to the downstream side of the filtering portion 3 reached 0.5% (hereinafter referred to as 0.5% breakthrough time), reached 1% (1% breakthrough time), reached 3% (3% breakthrough time), reached 5% (5% breakthrough time), and reached 10% (10% breakthrough time) with respect to Co=300 ppm, which was the concentration on the upstream side of the filtering portion 3, and the measurement results were input to the arithmetic processing unit 25, and formulas 16 and 17 below were obtained with regard to the formulas 11-1 and 11-2 programmed in the arithmetic processing unit 25.

With regard to the formula 11-1 in the case of RH≥50%

$S$ ppm BT=1/reference BT×($Co^{-0.7863}$×$10^{3.9554}$)× (3696×1/$Q$−21.404)×(0.1264×$EXP^{0.0193 \times Q}$×Ln ($S/Co$×100)+1)×(−0.0124×RH+1.6223)×(−0.0209×$T$+1.4199)    formula 16

It should be noted that, for example, when the concentration on the downstream side is 5 ppm, S=5 is assigned.

With regard to the formula 11-2 in the case of RH<50%

$S$ ppm BT=1/reference BT×($Co^{-0.7863}$×$10^{3.9554}$)× (3696×1/$Q$−21.404)×(0.1264×$EXP^{0.0193 \times Q}$×Ln ($S/Co$×100)+1)×(−0.0209×$T$+1.4199)    formula 17

It should be noted that, for example, when the concentration on the downstream side is 5 ppm, S=5 is assigned.

(9) While the predictive breakthrough time (5 ppm BT) in the case of S=5 in the formula 16 is calculated on various conditions, the breakthrough time of the mask 1 has been actually measured on each condition. As shown in Table 7, the predictive breakthrough time (S ppm BT) approximately corresponds with the actual measured breakthrough time on each condition, which proves a remarkable accuracy of the predictive breakthrough time according to the formula 16.

As is evident in this example, in the mask 1 using the canister KGS-1S or other filtering portion 3 which is equivalent to that of KGS-1S, the formulas 16 and 17 are programmed in the arithmetic processing unit 25, so that, when the temperature T, the relative humidity RH, the concentration Co, and the flow rate Q in the environment where the mask 1 is used are input, the breakthrough time in the environment can be calculated. Regarding the mask 1, one example in which the formulas 16 and 17 are input in the arithmetic processing unit 25 includes the input of reference conditions that are inherent in manufacturing the filtering portion 3. When the filtering portion 3 starts being used, the temperature T and the relative humidity RH of the air 40 in the use environment are detected, and filtering capacity determined by the reference conditions of the filtering portion 3 based on the formulas 4 and 5 can be corrected in such a manner as to correspond to the use environment.

Also, in the mask 1 that uses the filtering portion 3 whose specifications are different from those of the canister KGS-1S, data obtained based on the use of the filtering portion 3 are input to the formulas 11-1 and 11-2 programmed in the arithmetic processing unit 25, and constants regarding the formulas 11-1 and 11-2 are calculated, the breakthrough time of the filtering portion 3 corresponding to the environment where the mask 1 is used may be calculated.

TABLE 7

| Test condition | | | | | |
|---|---|---|---|---|---|
| Concentration $C_0$ (ppm) | Flow rate Q (L/min) | Temperature T (° C.) | Relative humidity RH(%) | Actual measured time (min) | Predicted time (min) |
| 600 | 40 | 20 | 50 | 36.7 | 39.9 |
| 300 | 30 | 35 | 70 | 55.5 | 59.8 |
| 300 | 20 | 20 | 80 | 107.3 | 114.6 |
| 600 | 30 | 20 | 80 | 38.3 | 36.3 |

The results in Table 7 show research results in the condition where the temperature T, the relative humidity RH, the concentration Co, and the flow rate Q of the air 40, which is outside air, are considered to be invariable in a period from the start of measuring the breakthrough time regarding the mask 1 in which the canister KGC-1S is used for the filtering portion 3 to the breakthrough of the mask 1. By "the flow rate Q is invariable" is meant that the flow of the air 40 is a steady flow or a flow that is not exactly the steady flow but is considered to be the steady flow.

Apart from this condition, the mask 1 is often used in the condition where at least one of the temperature T, the relative humidity RH, the concentration Co, and the flow rate Q is changed with a lapse of time. The example in which the flow rate Q in the mask 1 is changed from one minute to the next along with the repeat of the inhalation and exhalation of the wearer is a typical example concerning the condition.

Figure 11:
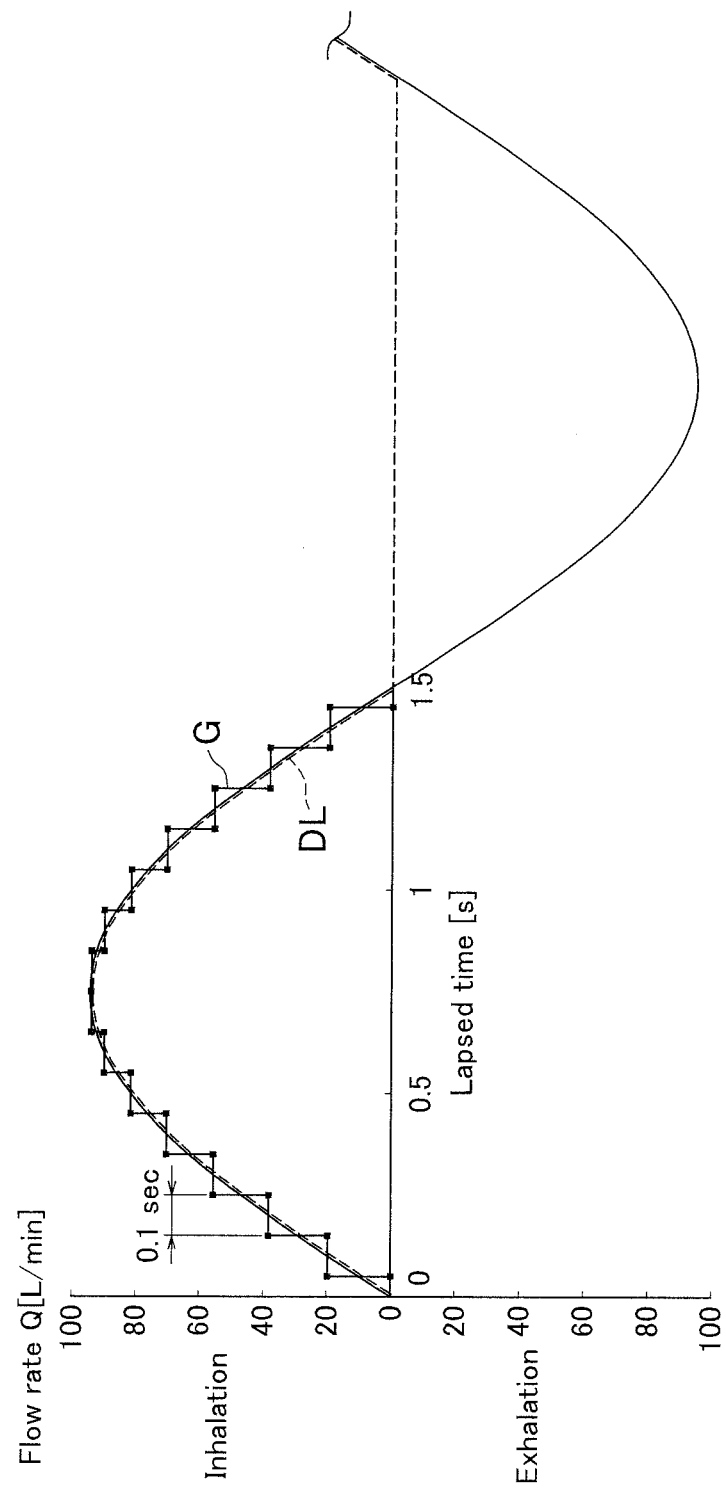
FIG. 11 is a graph illustrating variation in a flow rate of inhalation and exhalation.

FIG. 11 is a graph illustrating one example of a pulsating flow in which the flow rate of air through the filtering portion 3 with regard to the inhalation and exhalation at the time the wearer breathes is changed along with a lapse of time. In FIG. 11, it is assumed that the inhalation operation to inhale the air 40 is repeated at the rate of 20 times a minute while the flow rate of one breath of air, that is, the amount of inhalation is 1.5 L. It is assumed that it takes three seconds to carry out the one-time inhalation and exhalation operations, and the flow rate of air changed in the one-time inhalation and exhalation operations depicts a sinusoidal wave. In these inhalation and exhalation operations, the flow rate measuring unit 22 in FIG. 2 detects the flow rate of the air as a target to be detected in the inhalation operation. The flow rate of the air in the exhalation operation does not pass through the filtering portion 3. Accordingly, the flow rate of the air is treated as zero in the flow rate measuring unit 22. A dot-dash line DL in FIG. 11 shows the variation in the flow rate of the air to be detected in the flow rate measuring unit 22. In order to predict the breakthrough time of the mask 1 under the condition where the flow rate Q of the filtering portion 3 is changed as shown in the dot-dash line DL, it is preferable that the flow rate Q per unit time t be measured so as to get a degree of breakthrough progress per unit time with regard to the mask 1 along with a lapse of time. The unit time t can be set to an arbitrary time, and it is preferable that the unit time t be in a range of 1/6000 min (0.01 second) to 5/600 min (0.5 second) to calculate the degree of breakthrough progress corresponding to the ever-changing variation of the flow rate Q of the breathing of the wearer. A broken line G of FIG. 11 shows the variation of the flow rate on the assumption that the unit time t is 1/600 min (0.1 second), and during 0.1 second, the flow rate is invariable as a steady flow. The concentration Co, the flow rate Q, the temperature T, and the relative humidity RH may be measured based on the same unit time as that of the flow rate Q. However, unless the ever-changing variation occurs as in the case of the flow rate Q, it may be such that the concentration Co, the temperature T, and the relative humidity RH are measured based on a unit time longer than the unit time applied to the flow rate Q, for example, 10 min (600 seconds) or much longer. The degree of breakthrough progress is defined by a formula 18 below in which S ppm BT of the formulas 16 and 17 programmed in the arithmetic processing unit 25 is used.

degree of breakthrough progress=unit time $t/S$ ppm BT  formula 18

The formula 18 is a formula to calculate the breakthrough time required to reach the breakthrough concentration S ppm in the mask 1, that is, the degree of breakthrough progress per unit time with respect to S ppm BT. For example, when the unit time t is 1/600 min (0.1 second), and S ppm is 5 ppm, the formula 18 is expressed as follows.

degree of breakthrough progress=1/600/5 ppm BT

The formula 18 is programmed in the arithmetic processing unit 25, Co=300 ppm, the pulsating flow rate 30 L/min (sinusoidal wave pulsating flow of 1.5 L×20 times/min, which is illustrated in FIG. 11), T=20° C., RH=50%, the breakthrough reference concentration of 5 ppm, and the unit time t=1/600 min (0.1 second) were input to the arithmetic processing unit 25, and a time required for a value obtained by multiplying the degree of breakthrough progress to reach 1 was calculated. As the result of calculation, the predictive breakthrough time to be obtained was 91.9 minutes. Also, as for the mask 1, when the breakthrough time was actually measured under the breakthrough concentration having 5 ppm, the result was 94.6 minutes, which approximately corresponds with the predictive breakthrough time.

In the arithmetic processing unit 25 in which the degree of breakthrough progress is programmed, a use ratio or a residual use ratio (residual life span) of the filtering portion 3 and the like at an arbitrary time after starting the use of the mask 1 can be calculated according to formulas 19 to 21 below.

use ratio (%) of filtering portion 3=degree of breakthrough progress×10  formula 19 residual use ratio (%) of filtering portion 3=100−use ratio (%)  formula 20 residual time regarding filtering portion 3=(use time of filtering portion 3/degree of breakthrough progress)−(use time of filtering portion 3)  formula 21

The calculation results of the formulas 19 to 21 can be displayed on a display 27a through the arithmetic processing unit 25. Also, the alarm 26a can be operated based on the calculation results.

Even if the environment conditions where the mask 1 is worn are changed along with a lapse of time, the mask 1 in which the environment conditions such as the concentration Co and the flow rate Q are input per unit time so as to calculate the degree of breakthrough progress may calculate the breakthrough time corresponding to the change. Accordingly, in a state where the filtering portion is used under the condition where the degree of breakthrough progress exceeds 1, for example, in a case where the breakthrough concentration is set to a threshold value of the poisonous gas, a hazardous condition can be prevented where the mask 1 continues to be worn without replacing the filtering portion notwithstanding that the poisonous gas having the concentration higher than the threshold value is flowing out to the downstream side of the filtering portion. Further, on the assumption that the arithmetic processing unit 25 is set in a manner as to activate the alarm, for example, at a time when the degree of breakthrough progress reaches 0.9, the wearer can move from a place where there exists the poisonous gas to a place where there exists no poisonous gas in plenty of time. That is, the occurrence of the condition can be prevented where the canister reaches the breakthrough state while the wearer moves, and the wearer is exposed to the poisonous gas having the concentration higher than the threshold value.

There is a case where the air 40 on the upstream side of the filtering portion 3 in the mask 1 includes various types of poisonous gases, for example, a mixed gas made up of cyclohexane and toluene. In the mask 1 applied for the air 40 described above, firstly, the formulas 11-1 and 11-2 for the prediction of the breakthrough time of the air 40 including only the cyclohexane are produced in the arithmetic processing unit 25. Secondly, the formulas 11-1 and 11-2 for the prediction of the breakthrough time of the outside air including only the toluene are produced. Thirdly, the concentration per unit time with regard to each poisonous gas is input to the formula of the degree of breakthrough progress, which is calculated based on the formulas 11-1 and 11-2 for the prediction of the breakthrough time, and a time point when the sum of the multiplication result of the degrees of breakthrough progress of the cyclohexane and toluene reaches 1 is the breakthrough time of the mixed gas in the mask 1.

A formula 22 below is provided to predict the breakthrough time based on a relative breakthrough ratio (RBT) in place of the reference BT in the formula 16. When the relative breakthrough ratio of the cyclohexane gas is 1, the relative breakthrough ratios of the other poisonous gases are exemplified by the Table 8. Incidentally, these relative breakthrough ratios are known to the skills in the art.

BT($S$ ppm BT)=0.00997/RBT×((3273×RBT+452)/Q− ((3273×RBT+452)/30−100.3×RBT))× (($Co^{-0.7863}$×$10^{3.9554}$)×(1+log(300)/log($Co$)× (RBT−1)))×$T$)))$^{-0.6135}$×Ln($S/Co$×100)+1)×(− 0.0207×($T$−20)×1/RBT$^{1/2}$+1)×(−0.0124×(RH− 50)×1/RBT$^{1/2}$+1)  formula 22

In the formula 22 above:
RBT: relative breakthrough ratio
1/reference RBT=0.00997/relative breakthrough ratio
flow rate depending part: ((3273×RBT+452)/Q−((3273×RBT+452)/30−100.3×RBT))
concentration depending part: (($Co^{-0.7863}$×$10^{3.9554}$)×(1+log(300)/log(Co)×(RBT−1)))
breakthrough time ratio based on arbitrary breakthrough reference: ((0.2222×(0.00997×((3273×RBT+452)/Q−((3273×RBT+452)/30−100.3×RBT)))$^{-0.6135}$)×Ln(S/Co×100)+1)
temperature depending part: (−0.0207×(T−20)×1/RBT$^{1/2}$+1)
humidity depending part: (−0.0124×(RH−50)×1/RBT$^{1/2}$+1)

In Table 8, regarding 1% breakthrough time for various types of poisonous gases (test gases) applied in the mask 1, in FIG. 1, in which the canister KGC-1S is mounted, values calculated through the formula 22 and values actually measured are respectively shown in the cases of the steady flow and the pulsating flow. It should be noted that, when the flow rate Q is 30 L/min, the pulsating flow is provided as a pulsating flow of a sinusoidal wave of 1.5 L×20 times/min, and when the flow rate Q is 20 L/min, the pulsating flow is provided as a pulsating flow of a sinusoidal wave of 1.0 L×20 times/min. Concerning the prediction of the pulsating flow, 1/600 min (0.1 second) is used as the unit time t in the formula 18.

A formula 23 below is the correction of the formula 22 in such a manner as to calculate the breakthrough time in consideration of a dissolution rate (Hy %) of an organic solvent in water. Incidentally, the organic solvent is such that its vapor is considered to be poisonous.

dissolution rate: degree of dissolution in water×100(%)

$$BT = 0.00997/RBT \times ((3273 \times RBT + 452)/Q - ((3273 \times RBT + 452)/30 - 100.3 \times RBT)) \times ((Co^{-0.7863} \times 10^{3.9554}) \times (1 + \log(300)/\log(Co) \times (RBT-1)) \times 3 \times RBT))^{-0.6135} \times Ln(S/Co \times 100) + 1) \times (-0.0207 \times (T-20) \times 1/RBT^{1/2} + 1) \times (-0.0124 \times (RH-50) \times (100-Hy)/100 \times 1/RBT^{1/2} + 1)$$ formula 23

In Table 8, in MEK or cellosolve whose dissolution rate Hy is equal to or higher than 20%, when the relative humidity RH is 80%, the difference between the prediction value and the actual measured value of % breakthrough time tends to increase. In the formula 23, the humidity depending part of the formula 22, that is, $(-0.0124 \times (RH-50) \times 1/RBT^{1/2} + 1)$ is corrected as $(-0.0124 \times (RH-50) \times (100-Hy)/100 \times 1/RBT^{1/2} + 1)$, so that the prediction value ("prediction value in consideration of dissolution rate") can be brought close to the measured value (see Table 8). In the formula 23, the maximum value of the dissolution rate Hy is set to 50(%). When the dissolution rate is equal to or higher than 50%, there is no variation in influence on the breakthrough time. Accordingly, even when the dissolution rate is equal to or higher than 100%, the dissolution rate is provided as 50% in calculation.

TABLE 8

| | | | | Test condition | | | | 1% Breakthrough time | | |
|---|---|---|---|---|---|---|---|---|---|---|
| Flow | Test gas | Relative breakthrough ratio | Dissolution rate with respect to water of 100 ml (%) | Concentration $C_0$ ppm | Flow rate Q L/min | Temperature T °C. | Humidity RH % | Actual measured time | Predicted time | Predicted value in consideration of dissolution rate with respect to water |
| Steady Flow | Cellosolve | 1.62 | >100 | 300 | 30 | 20 | 50 | 164.3 | 164.9 | 164.9 |
| | | | | 300 | 30 | 20 | 50 | 161.0 | 164.9 | 164.9 |
| | | | | 300 | 30 | 20 | 80 | 133.9 | 116.7 | 136.0 |
| | | | | 300 | 30 | 20 | 80 | 133.9 | 116.7 | 136.0 |
| | MEK | 1.12 | 21.1 | 300 | 30 | 20 | 50 | 109.4 | 114.0 | 114.0 |
| | | | | 300 | 30 | 20 | 50 | 114.9 | 114.0 | 114.0 |
| | | | | 300 | 30 | 20 | 80 | 79.7 | 73.9 | 82.4 |
| | Methyl acetate | 0.61 | 24.4 | 300 | 30 | 20 | 50 | 27.9 | 27.5 | 27.5 |
| | | | | 300 | 30 | 15 | 80 | 44.2 | 36.7 | 44.9 |
| | | | | 300 | 30 | 20 | 80 | 40.1 | 32.4 | 39.6 |
| | | | | 300 | 30 | 35 | 80 | 22.1 | 19.5 | 23.9 |
| | Acetone | 0.46 | >100 | 300 | 30 | 20 | 50 | 48.3 | 46.8 | 46.8 |
| | | | | 300 | 30 | 20 | 50 | 44.1 | 46.8 | 46.8 |
| | | | | 300 | 30 | 20 | 80 | 33.6 | 21.1 | 31.4 |
| Pulsating Flow | Toluene | 1.69 | 0.045 | 300 | 30 | 20 | 50 | 117.1 | 126.3 | 126.3 |
| | | | | 300 | 30 | 20 | 50 | 118.8 | 126.3 | 126.3 |
| | Cellosolve | 1.62 | >100 | 300 | 30 | 20 | 50 | 116.6 | 120 | 120.0 |
| | | | | 600 | 30 | 30 | 80 | 42.3 | 39.5 | 46.1 |
| | MEK | 1.12 | 21.1 | 300 | 30 | 20 | 50 | 74.7 | 74.8 | 74.8 |
| | | | | 600 | 30 | 30 | 80 | 23.8 | 22.4 | 24.9 |
| | | | | 150 | 20 | 20 | 50 | 298.1 | 256.2 | 256.2 |
| | Clycohexane | 1.00 | <0.5 | 300 | 30 | 20 | 50 | 70.5 | 63.9 | 63.9 |
| | 2-Propanol | 0.92 | >100 | 600 | 30 | 30 | 80 | 21.5 | 15.9 | 20.6 |
| | | | | 150 | 20 | 20 | 50 | 164.7 | 196.8 | 196.8 |
| | Methyl acetate | 0.61 | 24.4 | 300 | 30 | 20 | 50 | 27.9 | 27.5 | 27.5 |
| | Diethyl Ethel | 0.55 | 1.2 | 600 | 30 | 30 | 80 | 4.6 | 4.9 | 4.9 |
| | | | | 150 | 20 | 20 | 50 | 90.3 | 96.1 | 96.1 |
| | Acetone | 0.46 | >100 | 600 | 30 | 30 | 80 | 1.8 | 2.4 | 3.9 |
| | | | | 150 | 20 | 20 | 50 | 77.2 | 71.4 | 71.4 |

In the mask 1 of FIG. 1, a formula 24 described below is a formula for the breakthrough-time prediction formula, which is obtained through the procedure similar to that of KGS-1S, with regard to a canister KGC-1L manufactured by Koken Ltd. and having a filtering element (having 78 mm in diameter and 22.5 mm in thickness) different from that of the canister KGC-1S including the formula 16. That is, test conditions of the temperature T, the relative humidity RH, the concentration Co, and the flow rate Q in Table 1 were applied to the canister KGC-1L, and the influence on the breakthrough time was observed in the course of the variation in the concentration Co and the like. The reference condition was such that the temperature T=20° C., the relative humidity RH=50%, the concentration Co=300 ppm, the flow rate Q=300 L/min, and 1% breakthrough time (concentration) were applied. On the basis of the reference condition, 1% predictive breakthrough time by the formula 24 in which the temperature T=20° C., the relative humidity RH=50%, the concentration Co=600 ppm, the flow rate Q=80 L/min were provided was 58.2 minutes, and the actual measured value of 1% breakthrough time was 61.9 minutes. Under the same test condition, the predictive breakthrough time of 5 ppm was 56.7 minutes, and the actual measured value of breakthrough time of 5 ppm was 60.1 minutes. Also, 1% predictive breakthrough time in the case where the concentration Co was 1800 ppm, and the flow rate Q was 80 L/min is 22.8 minutes, and the actual measured value of 1% breakthrough time was 23.2 minutes. Under the same condition, the predictive breakthrough time of 5 ppm was 18.7 minutes, and the actual measured value of breakthrough time of 5 ppm was 18.2 minutes. Thus, in the case of the canister KGC-1L, the prediction value and the actual measured value of the breakthrough time were approximately matched.

$$BT = 0.00306 \times (Co^{-0.8541} \times 10^{4.6328}) \times (10300 \times (1/Q) - 24.233) \times ((0.0724 \times EXP^{(0.0082 \times Q)}) \times Ln(S/Co \times 100) + 1) \quad \text{formula 24}$$

In the formula 24;
1/reference BT=0.00306
concentration depending part: $(Co^{-0.8541} \times 10^{4.6328})$
flow rate depending part: $(10300 \times (1/Q) - 24.233)$
breakthrough time ratio based on arbitrary breakthrough reference: $((0.0724 \times EXP^{(0.0082 \times Q)}) \times Ln(S/Co \times 100) + 1)$ It should be noted that the temperature T is fixed to 20° C., and the relative humidity RH is fixed to 50%.

Figure 12:
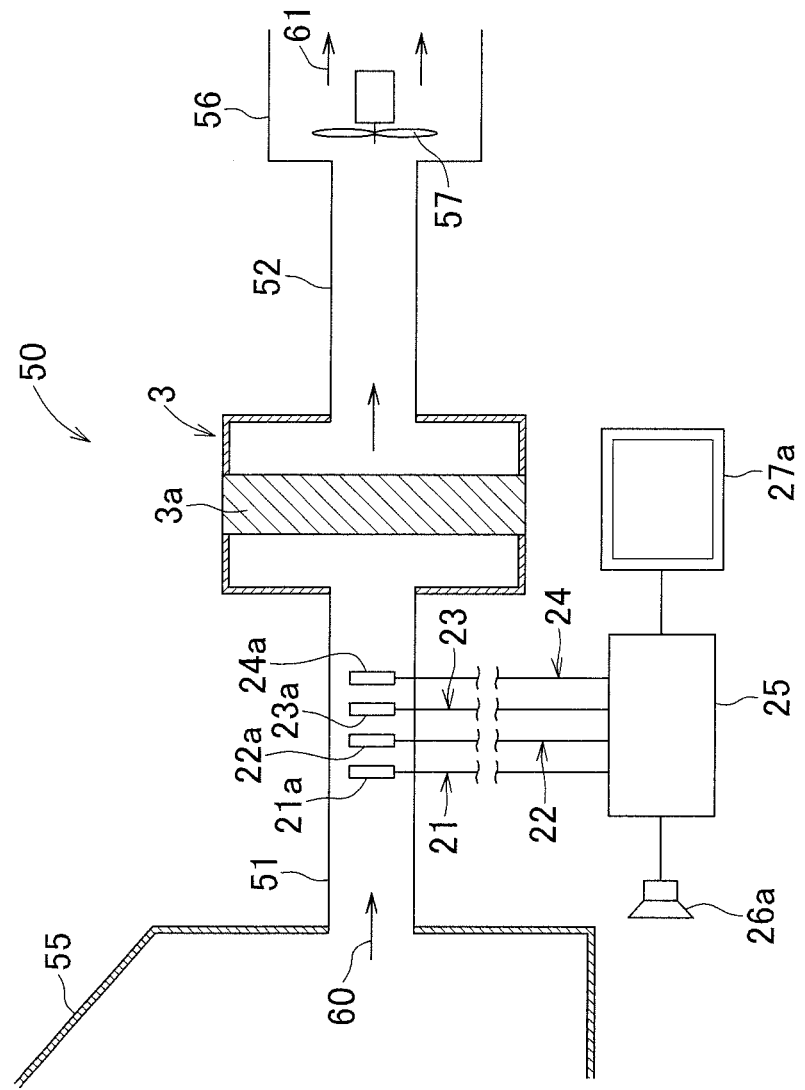
FIG. 12 is a cross-sectional view of a local exhaust device according to an embodiment of the present invention.

FIG. 12 is a side cross-sectional view of a local exhaust device 50 according to an embodiment of the present invention. The local exhaust device 50 is also referred to as the air cleaning apparatus, and a work booth 55 is formed on the upstream side of the device 50. A first duct 51 is extended from the booth 55 toward the downstream side. A downstream-side end portion of the first duct 51 is connected to the filtering portion 3 including the filtering element 3a. A second duct is extended from the filtering portion 3 toward the downstream side. A downstream-side end portion of the second duct 52 is connected to an exhaust chamber 56. The exhaust chamber 56 includes an exhaust fan 57, which allows air 60 in the inside of the booth 55 to transfer from the upstream side to the downstream side and discharge the air 60 to the outside of the exhaust chamber 56 as purified air 61. In the inside of the first duct 51, the sensors 21a, 22a, 23a, and 24a are respectively provided for the concentration measuring unit 21, the flow rate measuring unit 22, the temperature measuring unit 23, and the humidity measuring unit 24. The measuring units 21, 22, 23, and 24 are electrically connected to the arithmetic processing unit 25. The arithmetic processing unit 25 includes a display means such as the alarm 26a and the display 27a. In FIG. 12, it is possible to connect the arithmetic processing unit 25 to the respective measuring units 21, 22, 23, and 24 by radio. It is also possible to connect the arithmetic processing unit 25 to the alarm 26a and the display 27a by radio.

In the device 50, the poisonous gas is generated in the booth 55. The air 60 including the poisonous gas corresponds to the air 40 in FIG. 1 and is purified through the filtering portion 3 and discharged as the purified air 61.

In the device 50, the flow rate of the air 60 is substantially the same on the upstream side and the downstream side of the filtering portion 3, and the sensor 22a to measure the flow rate is provided on the upstream side of the filtering portion 3. However, as is the same case with the example in FIG. 2, it is possible to provide the sensor 22a on the downstream side of the filtering portion 3.

Figure 13:
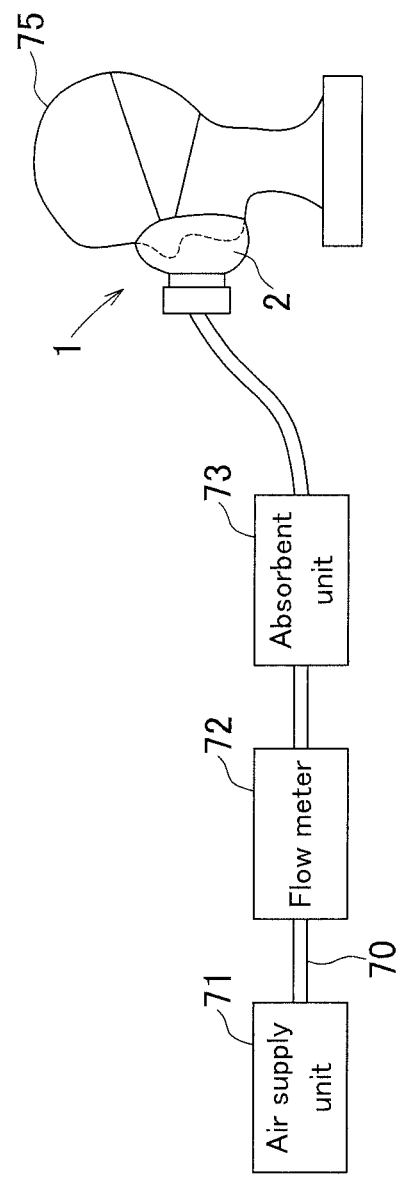
FIG. 13 is a diagram according to an embodiment of the present invention.

FIG. 13 is a diagram illustrating the gas mask 1 according to an embodiment of the present invention. The mask 1 includes an air supply unit 71 to supply inhalation air to the facepiece 2 via an air supply tube 70. A flow meter 72 and an adsorbent unit 73 are provided between the facepiece 2 and the air supply unit 71 and attached to a human-head model 75. Although not shown, the gas mask 1 includes a concentration measuring unit, a temperature measuring unit, a humidity measuring unit, and an arithmetic processing unit as seen in FIG. 1. Since the supply amount of inhalation air from the air supply unit 71 is invariably constant, the flow meter 72 may be provided on the upstream side of the adsorbent unit 73 as shown in the diagram and may be provided on the downstream side.

REFERENCE SIGNS LIST 1 air cleaning apparatus (mask)
3 filtering portion
3a filtering element
21 concentration measuring unit
21a detector (sensor)
22 flow rate measuring unit
22a detector (sensor)
23 temperature measuring unit
23a detector (sensor)
24 humidity measuring unit
24a detector (sensor)
25 arithmetic processing unit
26a alarm
27 display
40 outside air
50 local exhaust device
60 air
71 air supply unit
72 flow rate measuring unit (flow meter)
Co concentration
Q flow rate
T temperature
RH relative humidity

The invention claimed is:

1. An air cleaning apparatus comprising a filtering portion to allow air contaminated with a poisonous gas to pass through from an upstream side to a downstream side so as to remove the poisonous gas, and configured to be capable of predicting a breakthrough time until concentration of the poisonous gas on the downstream side of the filtering portion reaches breakthrough concentration, which is arbitrarily set with respect to the concentration of the poisonous gas, wherein the air cleaning apparatus further comprises an arithmetic processing unit configured to input data on the concentration of the poisonous gas included in the air on the upstream side of the filtering portion, a flow rate of the air passing through the filtering portion, a temperature of the air on the upstream side, and relative humidity of the air on the upstream side, and wherein a breakthrough-time prediction formula in which the concentration of the poisonous gas included in the air on the upstream side of the filtering portion used in the air cleaning apparatus, the flow rate, the temperature, and the relative humidity are provided as variables is programmed in the arithmetic processing unit, and the breakthrough time is predictable by the prediction formula based on the data, and further wherein the poisonous gas is a reference gas provided as a toxic gas to be arbitrarily selected, and concentration of the reference gas on the upstream side is represented as Co (ppm), and the flow rate is represented as Q (L/min), and the breakthrough concentration is represented as S (ppm), and a time during which concentration of the reference gas on the downstream side reaches S (ppm) is the breakthrough time, and wherein the prediction formula is represented by a formula below, breakthrough time=reference breakthrough time×concentration variation ratio×flow rate variation ratio×temperature variation ratio×humidity variation ratio×breakthrough concentration variation ratio;

reference breakthrough time: a duration time during which the concentration on the downstream side of the filtering portion reaches A %, which is a value that is less than 100% and arbitrarily set as the breakthrough concentration with respect to the concentration Co, in a case where the concentration Co, the flow rate Q, the temperature T, and the relative humidity RH are kept constant;

concentration variation ratio: a correction coefficient with respect to concentration variation calculated by obtaining the reference breakthrough times for the concentration Co at least on two levels while the flow rate, the temperature, and the humidity are kept constant;

flow rate variation ratio: a correction coefficient with respect to flow rate variation calculated by obtaining the reference breakthrough times for the flow rate Q at least on two levels while the concentration, the temperature, and the humidity are kept constant;

temperature variation ratio: a correction coefficient with respect to temperature variation calculated by obtaining the reference breakthrough times for the temperature T at least on two levels while the concentration, the flow rate, and the relative humidity are kept constant;

humidity variation ratio: a correction coefficient with respect to humidity variation calculated by obtaining the reference breakthrough times for at least two levels including one level at which a level of the relative humidity RH is equal to or higher than 50% while the concentration, the flow rate, and the temperature are kept constant;

breakthrough concentration variation ratio: a correction coefficient with respect to breakthrough concentration variation calculated by obtaining an A % breakthrough time corresponding to the breakthrough concentration A % obtained with respect to the flow rates Q at least on three levels, and a B % breakthrough time corresponding to breakthrough concentration B % that is different from the breakthrough concentration A % on one level of flow rate Q while the concentration, the temperature, and the humidity are kept constant.

2. The air cleaning apparatus according to claim 1, wherein the prediction formula is formulated in the arithmetic processing unit prior to use of the air cleaning apparatus, based on a reference condition that is constituted by the concentration of the poisonous gas included in the air on the upstream side, the flow rate, the temperature, the relative humidity, and the breakthrough concentration, and on the breakthrough time measured under the reference condition.

3. The air cleaning apparatus according to claim 2, wherein the arithmetic processing unit corrects the breakthrough time of the reference condition for the filtering portion, based on the temperature and the relative humidity.

4. The air cleaning apparatus according to claim 1, further comprising at least one of a detector of the concentration of the poisonous gas, a detector of the flow rate, a detector of the temperature, and a detector of the relative humidity.

5. The air cleaning apparatus according to claim 4, wherein the detector for any item of the data, out of the data on the concentration of the poisonous gas in the air on the upstream side of the filtering portion, the blow rate, the temperature, and relative humidity, is not used when the item has a constant value during use of the air cleaning apparatus.

6. The air cleaning apparatus according to claim 1, wherein the arithmetic processing unit is used in a cordless state.

7. The air cleaning apparatus according to claim 1, wherein at least one item of the data, out of the data on the concentration of the poisonous gas included in the air on the upstream side of the filtering portion, the flow rate, the temperature, and the relative humidity, is input to the arithmetic processing unit by radio.

8. The air cleaning apparatus according to claim 1, wherein the formula is represented by formulas (1) and (2) described below, (1) in a case of the relative humidity RH≥50%, breakthrough time=1/reference breakthrough time×$(Co^a \times 10^b) \times (c \times /Q + d) \times (i \times EXP^{j \times Q} \times Ln(S/Co \times 100) + 1) \times (e \times RH + f) \times (g \times T + h)$;

(2) in a case of the relative humidity RH<50%, breakthrough time=1/reference breakthrough time×$(Co^a \times 10^b) \times (c \times 1/Q + d) \times (i \times EXP^{j \times Q} \times Ln(S/Co \times 100) + 1) \times (g \times T + h)$; and in the formulas (1) and (2) above, reference breakthrough time: a duration time during which the concentration on the downstream side reaches A %, which is a value that is less than 100% and arbitrarily set with respect to the concentration Co, in a case where the concentration Co, the flow rate Q, the temperature T, and the relative humidity RH are kept constant;

T: temperature (° C.);

RH: relative humidity (%);

a, b: constants obtained based on the concentration Co at least on two levels and a breakthrough time during which the concentration of the poisonous gas on the downstream side of the filtering portion reaches A % of the concentration Co with regard to each concentration Co while the flow rate Q, the temperature T, and the relative humidity RH are kept constant;

c, d: constants obtained based on the flow rates Q at least on two levels and a breakthrough time during which the concentration of the poisonous gas on the downstream side of the filtering portion reaches A % of the concentration Co with regard to each flow rate Q while the concentration Co, the temperature T, and the relative humidity RH are kept constant;

e, f: constants obtained based on at least two levels including one level at which a level of the relative humidity RH is equal to or higher than 50%, and a breakthrough time during which the concentration of the poisonous gas on the downstream side of the filtering portion reaches A % of the concentration Co with regard to each relative humidity RH while the concentration Co, the flow rate Q, and the temperature T are kept constant;

g, h: constants obtained based on temperatures at least on two levels, and a breakthrough time during which the concentration of the poisonous gas on the downstream side of the filtering portion reaches A % of the concentration Co with regard to each temperature T while the concentration Co, the flow rate Q, and the relative humidity RH are kept constant;

i, j: constants obtained based on the A % breakthrough times and the flow rates Q in a case where the flow rate Q is changed at least on three levels, and the B % breakthrough time using one level out of the three levels of flow rate Q at which the A % breakthrough time is obtained, while the concentration Co, the temperature T, and the relative humidity RH are kept constant.

9. The air cleaning apparatus according to claim 1, wherein the arithmetic processing unit is programmed in such a manner that the breakthrough time is calculated by using a relative breakthrough ratio with respect to the reference gas of the poisonous gas.

10. The air cleaning apparatus according to claim 9, wherein correction based on a dissolution rate of an organic solvent in water is made for prediction of the breakthrough time for which the relative breakthrough ratio is used, wherein a gas of the organic solvent is considered to be poisonous.

11. The air cleaning apparatus according to claim 1, wherein, in the arithmetic processing unit, a degree of breakthrough progress per unit time with respect to the filtering portion can be obtained, and the breakthrough time of the filtering portion is calculated by multiplying the degree of breakthrough progress.

12. The air cleaning apparatus according to claim 11, wherein a time ranging from 1/6000 to 5/600 min is used for the unit time.

13. The air cleaning apparatus according to claim 1, wherein the arithmetic processing unit can calculate at least one of a residual breakthrough time and a residual use ratio with respect to the filtering portion.

14. The air cleaning apparatus according to claim 1, wherein the air cleaning apparatus is made up of any of a gas mask and a local exhaust device.

15. The air cleaning apparatus according to claim 14, wherein the detector of the flow rate is arranged in any of the upstream side and the downstream side of the filtering portion in the gas mask.

16. The air cleaning apparatus according to claim 14, wherein the detector of the flow rate is arranged in any of the upstream side and the downstream side of the filtering portion in the local exhaust device.

17. A method, in a case where air contaminated with a poisonous gas passes through a filtering portion of an air cleaning apparatus from an upstream side to a downstream side, for predicting a breakthrough time until concentration of the poisonous gas on the downstream side of the filtering portion reaches breakthrough concentration, which is arbitrarily set with respect to the concentration of the poisonous gas,
   wherein, in the air cleaning apparatus, data on the concentration of the poisonous gas included in the air on the upstream side of the filtering portion, a flow rate of the air passing through the filtering portion, a temperature of the air on the upstream side, and relative humidity of the air on the upstream side, are input to an arithmetic processing unit, and
   wherein, in the arithmetic processing unit, the breakthrough time is calculated based on the data and a breakthrough-time prediction formula programmed in the arithmetic processing unit, where the concentration of the poisonous gas included in the air on the upstream side, the flow rate, the temperature, and the relative humidity are provided as variables, and
   further wherein the poisonous gas is a reference gas provided as a toxic gas to be arbitrarily selected, and concentration of the reference gas on the upstream side is represented as Co (ppm), and the flow rate is represented as Q (L/min), and the breakthrough concentration is represented as S (ppm), and a time during which concentration of the reference gas on the downstream side reaches S (ppm) is the breakthrough time, and
   wherein the prediction formula is represented by a formula below, $$\text{breakthrough time} = \text{reference breakthrough time} \times \text{concentration variation ratio} \times \text{flow rate variation ratio} \times \text{temperature variation ratio} \times \text{humidity variation ratio} \times \text{breakthrough concentration variation ratio};$$

reference breakthrough time: a duration time during which the concentration on the downstream side of the filtering portion reaches A %, which is a value that is less than 100% and arbitrarily set as the breakthrough concentration with respect to the concentration Co, in a case where the concentration Co, the flow rate Q, the temperature T, and the relative humidity RH are kept constant;

concentration variation ratio: a correction coefficient with respect to concentration variation calculated by obtaining the reference breakthrough times for the concentration Co at least on two levels while the flow rate, the temperature, and the humidity are kept constant;

flow rate variation ratio: a correction coefficient with respect to flow rate variation calculated by obtaining the reference breakthrough times for the flow rates Q at least on two levels while the concentration, the temperature, and the humidity are kept constant;

temperature variation ratio: a correction coefficient with respect to temperature variation calculated by obtaining the reference breakthrough times for the temperatures T at least on equal to or more than two levels while the concentration, the flow rate, and the relative humidity are kept constant;

humidity variation ratio: a correction coefficient with respect to humidity variation calculated by obtaining the reference breakthrough times for at least two levels including one level at which a level of the relative humidity RH is equal to or higher than 50% while the concentration, the flow rate, and the temperature are kept constant;

breakthrough concentration variation ratio: a correction coefficient with respect to breakthrough concentration variation calculated by obtaining an A % breakthrough time corresponding to the breakthrough concentration A % obtained with respect to the flow rates Q at least on three levels, and a B % breakthrough time corresponding to breakthrough concentration B % that is different from the breakthrough concentration A % on one level of flow rate Q while the concentration, the temperature, and the humidity are kept constant.

18. The method according to claim 17, wherein the breakthrough-time prediction formula is formulated in the arithmetic processing unit prior to use of the air cleaning apparatus, based on a reference condition that is constituted by the concentration of the poisonous gas included in the air on the upstream side, the flow rate, the temperature, the relative humidity and the breakthrough concentration, and on the breakthrough time measured under the reference condition.

19. The method according to claim 18, wherein the arithmetic processing unit corrects the breakthrough time of the reference condition for the filtering portion, based on the temperature and the relative humidity.

20. The method according to claim 17,
wherein the formula is represented by formulas (1) and (2) described below, (1) in a case of the relative humidity RH≥50%, breakthrough time=1/reference breakthrough time× $(Co^a \times 10^b) \times (c \times 1/Q+d) \times (i \times EXP^{j \times Q} \times Ln(S/Co \times 100)+1) \times (e \times RH+f) \times (g \times T+h)$;

(2) in a case of the relative humidity RH<50%, breakthrough time=1/reference breakthrough time× $(Co^a \times 10^b) \times (c \times 1/Q+d) \times (i \times EXP^{j \times Q} \times Ln(S/Co \times 100)+1) \times (g \times T+h)$; and in the formulas (1) and (2) above, reference breakthrough time: a duration time during which the concentration on the downstream side reaches A %, which is a value that is less than 100% and arbitrarily set with respect to the concentration Co, in a case where the concentration Co, the flow rate Q, the temperature T, and the relative humidity RH are kept constant;

T: temperature (° C.);
RH: relative humidity (%);

a, b: constants obtained based on the concentration Co at least on two levels and a breakthrough time during which the concentration of the poisonous gas on the downstream side of the filtering portion reaches A % of the concentration Co with regard to each concentration Co while the flow rate Q, the temperature T, and the relative humidity RH are kept constant;

c, d: constants obtained based on the flow rates Q at least on two levels and a breakthrough time during which the concentration of the poisonous gas on the downstream side of the filtering portion reaches A % of the concentration Co with regard to each flow rate Q while the concentration Co, the temperature T, and the relative humidity RH are kept constant;

e, f: constants obtained based on at least two levels including one level at which a level of the relative humidity RH is equal to or higher than 50%, and a breakthrough time during which the concentration of the poisonous gas on the downstream side of the filtering portion reaches A % of the concentration Co with regard to each relative humidity RH while the concentration Co, the flow rate Q, and the temperature T are kept constant;

g, h: constants obtained based on temperatures at least on two levels, and a breakthrough time during which the concentration of the poisonous gas on the downstream side of the filtering portion reaches A % of the concentration Co with regard to each temperature T while the concentration Co, the flow rate Q, and the relative humidity RH are kept constant;

i, j: constants obtained based on an A % breakthrough time and the flow rate Q in a case where the flow rate Q is changed at least on three levels, and a B % breakthrough time on one level out of the three levels of the flow rate Q at which the A % breakthrough time is obtained, while the concentration Co, the temperature T, and the relative humidity RH are kept constant.

21. The method according to claim 17,
wherein the arithmetic processing unit is programmed in such a manner that the breakthrough time can also be calculated by using a relative breakthrough ratio gas of the poisonous gas with respect to the reference.

22. The method according to claim 21,
wherein correction based on a dissolution rate of an organic solvent in water is made for prediction of the breakthrough time for which the relative breakthrough ratio is used, wherein a gas of the organic solvent is considered to be poisonous.

* * * * *